(12) United States Patent
Uhrenholt et al.

(10) Patent No.: US 11,625,332 B2
(45) Date of Patent: Apr. 11, 2023

(54) CACHE MISS HANDLING FOR READ OPERATIONS IN DATA PROCESSING SYSTEMS

(71) Applicant: Arm Limited, Cambridge (GB)

(72) Inventors: Olof Henrik Uhrenholt, Lomma (SE); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/742,519

(22) Filed: Jan. 14, 2020

(65) Prior Publication Data
US 2021/0216464 A1 Jul. 15, 2021

(51) Int. Cl.
| | | |
|---|---|---|
| *G06F 12/0891* | (2016.01) | |
| *G06F 12/0893* | (2016.01) | |
| *G06F 9/54* | (2006.01) | |
| *G06F 12/02* | (2006.01) | |
| *G06F 9/30* | (2018.01) | |
| *G06F 12/0811* | (2016.01) | |

(52) U.S. Cl.
CPC ...... *G06F 12/0891* (2013.01); *G06F 9/30047* (2013.01); *G06F 9/542* (2013.01); *G06F 12/0238* (2013.01); *G06F 12/0811* (2013.01); *G06F 12/0893* (2013.01); *G06F 2212/401* (2013.01)

(58) Field of Classification Search
None
See application file for complete search history.

(56) References Cited

U.S. PATENT DOCUMENTS

| | | |
|---|---|---|
| 5,943,421 A | 8/1999 | Grabon |
| 6,181,350 B1 | 1/2001 | Corona |
| 6,449,692 B1 * | 9/2002 | Krueger .............. G06F 3/14 345/543 |
| 6,483,516 B1 | 11/2002 | Tischler |
| 6,518,974 B2 | 2/2003 | Taylor |
| 7,171,051 B1 | 1/2007 | Moreton |
| 8,271,734 B1 | 9/2012 | Glasco |
| 8,411,753 B2 | 4/2013 | Cha |

(Continued)

OTHER PUBLICATIONS

Cheriton et al. "Software-Controlled Caches in the VMP Multiprocessor." May 1986. ACM. ACM SIGARCH Computer News. pp. 366-374. (Year: 1986).*

(Continued)

*Primary Examiner* — Nathan Sadler
(74) *Attorney, Agent, or Firm* — Vierra Magen Marcus LLP

(57) ABSTRACT

In a data processing system comprising a cache system configured to transfer data stored in a memory system to a processor and vice-versa, a processing unit operable to read data from a cache of the cache system can send a read request for data to the cache. The cache system, in response to the read request, determines whether the requested data is present in the cache. When the requested data is present in the cache, the cache system returns the data from the cache to the processing unit and invalidates the entry for the data in the cache. When the requested data is not present in the cache, the cache system returns an indication of that to the processing unit, without the cache system sending a request for the data towards the memory system.

24 Claims, 11 Drawing Sheets

(56) References Cited

U.S. PATENT DOCUMENTS

| | | | |
|---|---|---|---|
| 8,447,948 | B1 | 5/2013 | Erdogan |
| 8,542,939 | B2 | 9/2013 | Nystad |
| 8,988,443 | B2 | 3/2015 | Croxford |
| 8,990,518 | B2 | 3/2015 | Nystad |
| 9,014,496 | B2 | 4/2015 | Nystad |
| 9,116,790 | B2 | 8/2015 | Nystad |
| 9,239,784 | B1* | 1/2016 | Haghighi ............ G06F 12/0868 |
| 9,406,155 | B2 | 8/2016 | Oterhals |
| 9,881,401 | B2 | 1/2018 | Oterhals |
| 10,388,057 | B2 | 8/2019 | Fielding |
| 2003/0151610 | A1 | 8/2003 | Kuriakin |
| 2007/0252843 | A1 | 11/2007 | Yu |
| 2009/0160857 | A1 | 6/2009 | Rasmusson |
| 2010/0161904 | A1 | 6/2010 | Cypher |
| 2010/0281212 | A1 | 11/2010 | Selvan |
| 2014/0122809 | A1 | 5/2014 | Robertson |
| 2014/0140401 | A1 | 5/2014 | Lee |
| 2014/0156948 | A1 | 6/2014 | Roberts |
| 2014/0330796 | A1* | 11/2014 | Dally ................. G06F 16/1744 707/693 |
| 2015/0169459 | A1 | 6/2015 | Huang |
| 2015/0178214 | A1 | 6/2015 | Alameldeen |
| 2016/0048980 | A1 | 2/2016 | Wang |
| 2017/0024158 | A1 | 1/2017 | Brkic et al. |
| 2017/0255562 | A1 | 9/2017 | Usui et al. |
| 2017/0256024 | A1 | 9/2017 | Abraham |
| 2017/0262373 | A1 | 9/2017 | Bedi |
| 2017/0285955 | A1 | 10/2017 | Carter et al. |
| 2017/0286302 | A1 | 10/2017 | Roy |
| 2017/0287101 | A1 | 10/2017 | Flordal et al. |
| 2017/0293561 | A1 | 10/2017 | Dwiel |
| 2017/0295379 | A1 | 10/2017 | Sun |
| 2018/0089091 | A1 | 3/2018 | Akenine-Moller et al. |
| 2018/0286010 | A1* | 10/2018 | Koker ................. G06F 12/0815 |
| 2019/0096027 | A1 | 3/2019 | Fielding |
| 2020/0160484 | A1 | 5/2020 | Appu et al. |
| 2020/0167076 | A1 | 5/2020 | Lai et al. |

OTHER PUBLICATIONS

Jacob et al. "Software-Managed Address Translation." Feb. 1997. IEEE. HPCA '97. pp. 156-167. (Year: 1997).*

Abali et al. "Performance of Hardware Compressed Main Memory." Jan. 2001. IEEE. HPCA '01. pp. 73-81. (Year: 2001).*

Espasa et al. "Tarantula: A Vector Extension to the Alpha Architecture." May 2002. IEEE. ISCA '02. pp. 281-292. (Year: 2002).*

Zheng et al. "Performance Evaluation of Exclusive Cache Hierarchies." Mar. 2004. IEEE. ISPASS '04. pp. 89-96. (Year: 2004).*

Shahar et al. "ActivePointers: A Case for Software Address Translation on GPUs." Jun. 2016. IEEE. ISCA '16. pp. 596-608. (Year: 2016).*

Tom Shanley. The Unabridged Pentium 4. Jul. 2004. "Finding the Location of a Physical Page" section.*

Barroso et al. "Piranha: A Scalable Architecture Based on Single-Chip Multiprocessing." 2000. ACM. ISCA '00. pp. 282-293.*

William Stallings. Computer Organization and Architecture: Designing for Performance. 2010. Prentice Hall. 8th ed. pp. 640-645.*

Lefurgy et al. "Reducing Code Size with Run-time Decompression." Jan. 2000. IEEE. HPCA2000.*

IBM. "CodePack PowerPC Code Compression Utility User's Manual." Mar. 2001. IBM. Version 4.1.*

Uhrenholt, et al., U.S. Appl. No. 16/742,495, titled "Cache Arrangement for Data Processing Systems," filed Jan. 14, 2020.

Uhrenholt, et al., U.S. Appl. No. 16/742,556, titled "Data Processing Systems," filed Jan. 14, 2020.

Office Action dated Jan. 11, 2019, U.S. Appl. No. 15/714,037.

Response to Office Action dated Jul. 10, 2019, U.S. Appl. No. 15/714,037.

Final Office Action dated Aug. 6, 2019, U.S. Appl. No. 15/714,037.

Office Action dated Dec. 12, 2018, U.S. Appl. No. 16/029,619.

Response to Office Action dated Mar. 12, 2019, U.S. Appl. No. 16/029,619.

Notice of Allowance dated Apr. 5, 2019, U.S. Appl. No. 16/029,619.

UK Patent Application No. 1711269.9, filed Jul. 13, 2017, "Graphics Processing Systems," Applicant Arm Limited.

UK Filing Receipt dated Jul. 13, 2017, UK Patent Application No. 1711269.9, filed Jul. 13, 2017, "Graphics Processing Systems," Applicant Arm Limited.

Zhang et al., Enabling Partial Cache Line Prefetching Through Data Compression, URL: www.cs.ucr.edu/~gupta/research/Publications/Comp/icpp03.pdf (Year: 2003).

Non-Final Office Action dated Feb. 26, 2021 in U.S. Appl. No. 16/742,556.

Response to Non-Final Office Action dated May 26, 2021, U.S. Appl. No. 16/742,556.

Non-Final Office Action dated Jun. 11, 2021, U.S. Appl. No. 16/742,495.

Final Office Action dated Jul. 30, 2021, U.S. Appl. No. 16/742,556.

Response to Final Office Action dated Sep. 29, 2021, U.S. Appl. No. 16/742,556.

Response to Non-Final Office Action dated Oct. 11, 2021, U.S. Appl. No. 16/742,495.

Notice of Allowance dated Oct. 21, 2021, U.S. Appl. No. 16/742,556.

Final Office Action dated Nov. 8, 2021, U.S. Appl. No. 16/742,495.

Response to Final Office Action dated Mar. 28, 2022, U.S. Appl. No. 16/742,495.

Non-Final Office Action dated Apr. 29, 2022, U.S. Appl. No. 16/742,495.

Response to Non-Final Office Action dated Sep. 29, 2022, U.S. Appl. No. 16/742,495.

Final Office Action dated Oct. 25, 2022, U.S. Appl. No. 16/742,495.

Response to Final Office Action dated Feb. 6, 2023, U.S. Appl. No. 16/742,495.

* cited by examiner

CACHE MISS HANDLING FOR READ OPERATIONS IN DATA PROCESSING SYSTEMS

BACKGROUND

The technology described herein relates to data processing systems and in particular to cache operations in data processing systems.

In data processing systems, to assist with storing data locally to a data processing unit while data processing operations using the data are being performed, a cache may be used. This helps to reduce the need to fetch data from slower data stores, such as main memory of the data processing system.

The Applicants believe that there remains scope for improvements to cache operations in data processing systems.

BRIEF DESCRIPTION OF THE DRAWINGS

Various embodiments of the technology described herein described herein will now be described by way of example only and with reference to the accompanying drawings, in which.

Like reference numerals are used for like elements and features in the Figures, where appropriate.

DETAILED DESCRIPTION

Figure 1:
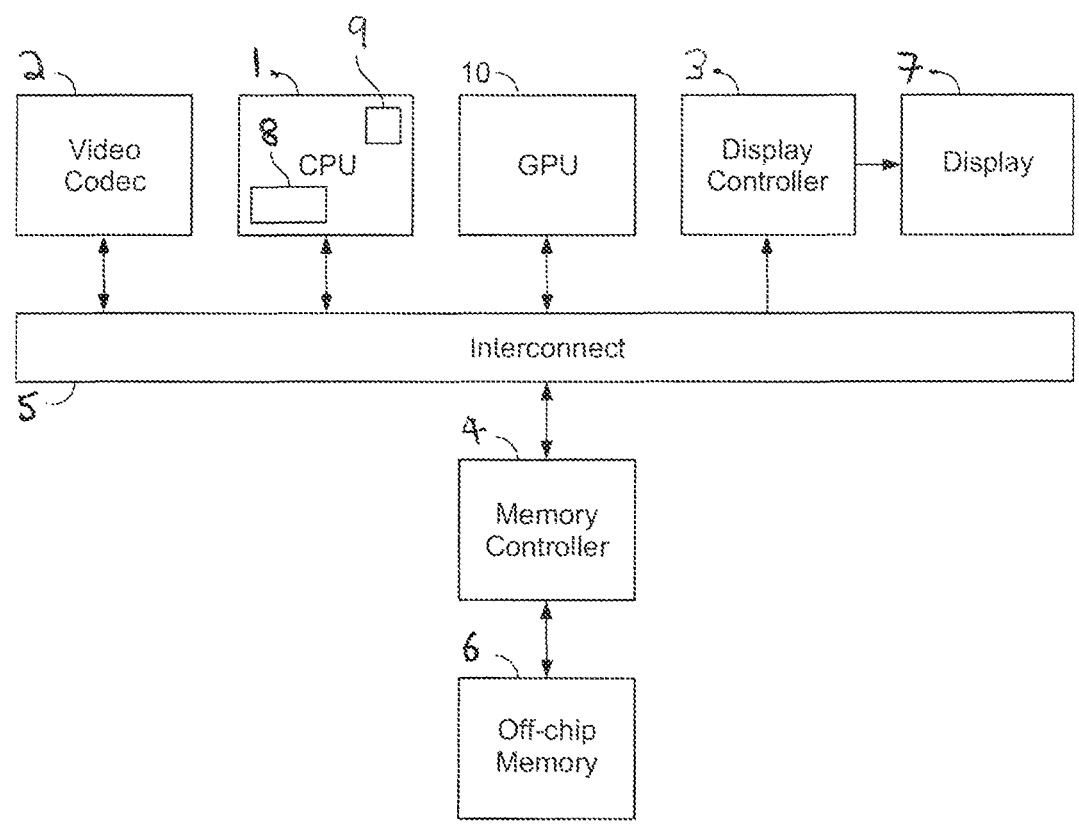
FIG. 1 shows an exemplary graphics processing system in which the technology described herein may be implemented.

A first embodiment of the technology described herein comprises a method of operating a data processing system, the data processing system comprising:

a memory system;
a processor; and
a cache system configured to transfer data stored in the memory system to the processor for use by the processor when performing data processing operations and to transfer data from the processor to the memory system;
the cache system comprising a cache configured to receive data from the memory system and to provide data to the processor for use when performing processing operations and to receive data from the processor for sending to the memory system;
the data processing system further comprising a processing unit operable to read data from the cache;
the method comprising:
when the processing unit requires data from the cache, sending a read request for the data to the cache;
the cache system, in response to the read request, determining whether the requested data is present in the cache; and
when the requested data is present in the cache, returning the data from the cache to the processing unit and invalidating the entry for the data in the cache; and
when it is determined that the requested data is not present in the cache, returning an indication of that to the processing unit, without the cache system sending a request for the data towards the memory system.

A second embodiment of the technology described herein comprises a data processing system, the data processing system comprising:

a memory system;
a processor; and
a cache system configured to transfer data stored in the memory system to the processor for use by the processor when performing data processing operations and to transfer data from the processor to the memory system;
the cache system comprising a cache configured to receive data from the memory system and to provide data to the processor for use when performing processing operations and to receive data from the processor for sending to the memory system;
the data processing system further comprising:
a processing unit operable to read data from the cache, the processing unit being configured to, when the processing unit requires data from the cache, send a read request for the data to the cache;
and
the cache system being configured to, in response to the read request:
determine whether the requested data is present in the cache; and
when the requested data is present in the cache, return the data from the cache to the processing unit and invalidate the entry for the data in the cache; and
when it is determined that the requested data is not present in the cache, return an indication of that to the processing unit, without the cache system sending a request for the data towards the memory system.

The technology described herein relates to a data processing system that comprises a cache system operable to transfer data from a memory system to a processor that requires that data and vice-versa.

In the technology described herein, when a processing unit requires data, a read request can be submitted to a cache of the cache system to determine whether the data is present in the cache or not.

In response to the read request, it is determined whether the data is present in the cache of the cache system or not, and if the data is present in the cache, it is sent to the processing unit and the entry (e.g., and in an embodiment, the cache line) storing the data in the cache is invalidated.

On the other hand, if the requested data is not present in the cache, an indication of that is sent to the processing unit, but without the cache system triggering or sending a request to the memory system for that "missing" data (which is in contrast to normal cache operations where a "miss" when attempting to read data from a cache would in the normal course trigger a request to the memory system for the "missing" data).

Thus the operation in the manner of the technology described herein can allow the presence of data in the cache to be determined, before any external memory read transaction for that data is triggered.

The effect of this then is that the read operation in the manner of the technology described herein can be used to test for the presence of data in the cache system, but while guaranteeing that there will be no external memory transaction triggered by the "read operation". It therefore permits, in effect, an "opportunistic" cache read that will avoid any external memory read bandwidth in the event of a miss in the cache.

As will be discussed further below, the Applicants have recognised that such operation in the context of a cache system may be useful, in particular in the situation where the presence of required data in the cache system is not known beforehand, but it is desired to ensure that there will be no external memory bandwidth in the event that it turns out that the data is not present in the cache.

Correspondingly, the operation in the manner of the technology described herein can allow the processing unit to determine how to proceed based on whether the required data is present in the cache or not, before any external memory read transaction is triggered.

The data processing system of the technology described herein includes a memory system, a data processor and a cache system.

The memory (memory system) of the data processing system may comprise any suitable and desired memory and memory system of the data processing system, such as, and in an embodiment, a main memory for the particular processor in question (e.g. where there is a separate memory system for the processor), or a main memory of the data processing system that is shared with other elements, such as a host processor (CPU), of the data processing system.

The processor of the data processing system can comprise any suitable and desired processor of the data processing system, such as a CPU (central processing unit), a graphics processor (GPU (graphics processing unit)), a display processor (DPU (display processing unit)), a video processor (VPU (video processing unit)), an image signal processor (ISP), etc. In an embodiment, it comprises a graphics processor (GPU).

The processor should, and in an embodiment does, comprise one or more (and in an embodiment a plurality of) processing cores, which are operable to perform processing operations on data to be processed by the processor.

Correspondingly, the cache system and the cache is in an embodiment configured to provide data to the processing core or cores of the processor for use when performing processing operations and correspondingly to receive data from the processing core or cores of the processor for sending to the memory system.

The cache system that is arranged between the memory system and the processor can be any suitable and desired cache system that is operable to and configured to hold data between a processor (the processing core or cores of a processor) and a memory system. Thus it may, for example, be a system cache that is shared between plural processors, or a cache for a particular processor.

The cache system may comprise a single cache "level", in which case it will be that cache level that the processing unit makes its read request to (and with which the processing unit is associated (e.g.)).

In embodiments, the cache system comprises multiple cache levels (a cache hierarchy), such as L1, L2 and L3 caches. In this case, the cache that the read request is made to is in an embodiment one level of the cache system. In this case, the cache that the read request is made to and that operates in the manner of the technology described herein is a cache level that is closer to the processor (the processing cores of the processor), and in an embodiment the cache level from which data is provided to and received from the processing cores of the processor of the cache hierarchy, such as, and in an embodiment, the L2 cache. Thus, in an embodiment, the cache that the read request is made to is the L2 cache of the cache system.

In the case where the cache system includes multiple cache levels, then the cache system (the multiple cache levels) is in an embodiment configured and arranged to be "coherent" (i.e. such that all copies of the same data in the cache system (across the cache levels) are kept synchronised (are ensured to be the same (i.e. such that when one copy of the data is changed, the other copies within the cache system and the memory system are changed to reflect that change)).

In the case where the cache system includes multiple cache levels, then in the event that there are lower cache levels (i.e. cache levels that are closer to the processor (further from the memory system)) than the cache to which the read request is made (thus in the case where the read request is made to an L2 cache and there is an L1 cache, for example), at least in the case where the cache system is coherent (and in an embodiment only in the case where the cache system is coherent), the determining of whether the requested data is present in the cache to which the read request is made in an embodiment comprises determining whether the requested data is present in the cache to which the read request is made or in a lower level cache of the cache system (i.e. in a cache level that is closer to the processor (further from the memory system) than the cache to which the read request is made).

In an embodiment, the read request is made to the cache, and if the requested data is not present in the cache (e.g. the L2 cache) to which the read request is initially made, it is then determined whether the data is present in a lower level cache (e.g. the L1 cache). In an embodiment, in the event that the data is present in the lower level cache, the data is then evicted from the lower level cache to the cache (e.g. the L2 cache) to which the initial read request was made (and then the read request is repeated to fetch the data from the cache to which the initial read request was made (e.g. the L2 cache)).

In the case where there are multiple levels below (closer to the processor than) the cache level to which the read request from the processing unit was initially made, then this operation of testing for the presence of the required data in a lower cache level and moving the data up the cache levels to the cache to which the read request was made is in an embodiment performed accordingly for a and for each lower cache level that it is desired to check for the presence of the requested data.

In other words, in an embodiment, the operation of determining whether the data is present in the cache comprises determining whether the data is present in the cache to which the read request is made (e.g. the L2 cache), and in the event that the data is not present in that cache, then determining whether the data is present in any lower level caches, and in the event that the data is present in the lower level caches, evicting data from the lower level caches to the cache to which the read request was made, such that the cache to which the read request was made can then return the requested data to the requesting processing unit.

The effect of this then is that the read request operation will operate to determine whether the requested data is present in the cache level to which the read request is made and any lower levels of the cache system (and to extract that data from the cache system (if so)).

Correspondingly, in the case where the cache system includes cache levels that are higher (that are closer to the memory system) than the cache to which the read request was made, the operation in the manner of the technology described herein in an embodiment does not trigger any read request to those higher cache levels in the event that the data is not present in (or below) the cache (level) to which the read request was made. Thus in the event that the requested data is not present in the cache to which the read request was made (or any cache levels lower than that cache, where appropriate), there is no read request sent to any higher level in the cache system (towards the memory system from the cache level to which the read request was made) by the cache system in response to the read request.

The cache the read request is made to can be configured in any suitable and desired manner, e.g. in accordance with the normal cache arrangements of the processor and data processing system in question.

Thus the cache will in an embodiment comprise a plurality of cache lines, each able to store a respective data entry or entries. Each cache line will also be associated with appropriate metadata, such as, and in an embodiment, one or more of, and in an embodiment all of: an identifier (a tag) for the data that is stored in the cache line; a "valid" flag (bit) to indicate that the data in the cache line is valid; a "free" flag (bit) to indicate that the cache line is available for allocation for storing data; and a "dirty" flag (bit) to indicate that the data in the cache line has been modified since it was written from the memory to the cache line.

In an embodiment, the data entries in the cache (the cache lines) can be, and are also, associated with an indication of whether the data entry (the cache line) should be processed by the processing unit or not. Thus, in an embodiment, each cache line is associated with a "processing unit" flag (bit) to indicate whether that cache line (the data in that cache line) should be processed by the processing unit or not. This indication may be set, for example, on cache line fill or write from lower level caches.

In this case, if the "processing unit" flag is set to indicate that the cache line should be processed by the processing unit, then the operation of the processing unit with respect to the cache in the manner of the technology described herein will be triggered if the cache line is to read/evicted, etc. On the other hand, if the "processing unit" flag is not set (such that the cache line is not indicated as to be handled by the processing unit), then the cache line can be handled in the normal manner for the cache and cache system in question.

Thus, in an embodiment, some entries in the cache (cache lines) will be handled by the processing unit, whereas other entries in the cache (cache lines) may be handled in the normal manner for the cache and cache system in question.

There may be a single physical cache, or the cache may be divided into plural separate physical portions ("slices"), with each slice, e.g., storing respective data, e.g. for a respective processing core of the processor.

The cache that the read request is made to may interface with the processor (the processing cores of the processor) so as to be able to transfer data therebetween in any suitable and desired manner. In an embodiment, there is an appropriate interconnect, such as an asynchronous switch network (ASN), that interfaces between the cache (e.g. the L2 cache) and the processor (the processing core(s) of the processor).

The data that is stored in the cache (and that the processor is using when performing a processing operation) can comprise any suitable and desired data that a data processor may operate on. The data in an embodiment comprises data of a data array that the processor is processing, the data array comprising an array of data elements each having an associated data value(s).

In the case of a graphics processor, the data array may comprise, for example, and in an embodiment, an image that the graphics processor is processing, and thus the data will comprise appropriate colour values for the data elements (sampling positions) of the data array and that the data array represents. In this case, the data array may comprise, for example, a frame (the frame buffer) that the graphics processor is processing, e.g. for display, and/or data, such as a graphics texture, that is being used or generated by the graphics processor. In other arrangements, the data may comprise geometry data, such as for or of vertices and/or primitives that the graphics processor is processing. Thus, in an embodiment, the data that is stored in the cache and handled in the manner of the technology described herein comprises image data (e.g. a texture or frame) or geometry data (positions and/or attributes).

The data processing operation that the processor is performing using the data can correspondingly be any suitable and desired processing operation that a processor can perform.

In the case of a graphics processor it may, for example, be an appropriate graphics geometry processing operation, or a fragment (pixel) shading operation, etc. In an embodiment, the processing operation is a graphics shading operation, such as a geometry shading, vertex shading, or fragment shading operation. The operation could also be a compute shading operation, where the graphics processor is performing compute shading operations.

Subject to the particular operation of the technology described herein, the cache system can otherwise operate in any suitable and desired manner, such as, and in an embodiment, in accordance with the normal manner for cache operations in the data processing system in question.

For instance, when the processor requires some input data that is presumed to reside in the memory system, a read request for that data is in an embodiment first issued to the cache system, with the read request being passed through the cache system and memory hierarchy, i.e. from the processor through the cache system and ultimately to the memory system, as required.

Correspondingly, when the processor has data that is to be written to the memory system, the processor will issue a write request to write that data to the cache, and the data will be written to the cache. Data in the cache will then be written back to the memory system when it falls to be evicted from the cache.

Correspondingly, when data (e.g. a cache line) falls to be evicted from the cache (and that eviction process is not being performed and triggered in the particular manner of the operation of the technology described herein), the eviction process can, and in an embodiment does, otherwise operate in accordance with the normal eviction process for the cache system and data processing system in question.

It will be appreciated in this regard that where the cache system includes multiple cache levels, with only one of which cache levels, e.g. the L2 cache, operating in the manner of the technology described herein, then the writing of data from the cache to the memory system and the reading of data from the memory system into the cache (that operates in the manner of the technology described herein) may comprise writing that data to and reading that data from a cache level that is closer to the memory system, as appropriate (where the required data can be and/or is already cached in the cache system at a level that is closer to the memory system itself).

Thus, where data is written from the cache towards the memory system, that data could be retained at a higher level in the cache system that is closer to the memory system without reaching the memory system itself.

The processing unit that makes the read request to the cache can be any suitable and desired processing unit that may require data from the cache (and accordingly operate to process that data). (The read request may, e.g., and in an embodiment, be made in a corresponding manner to other read requests that may be made to the cache in the data processing system in question).

It could be the processor itself (a processor core of the processor) that makes the read request to the cache. Thus in this case, the processing unit that make the read request to the cache would be a (the) processor that the cache system serves.

In an embodiment, the processing unit is not the processor itself (is not a processing core of the processor), but is a separate processing unit to the processor, such as, and in an embodiment, a processing unit that is associated with, and, e.g., integrated with, the cache system and/or the cache in question. In other words, the processing unit would be a processing unit that is otherwise able to process data from the cache in addition to and independently of the processor (the processing core(s) of the processor) itself.

Other than being able to make a read request and operate in the manner of the technology described herein, the processing unit that makes the read request can otherwise be configured, and operate in any suitable and desired manner. For example, it may process the data read from the cache in any suitable and desired manner.

The processing unit in an embodiment comprises its own appropriate (local) storage (e.g. a buffer) for buffering (temporarily storing) data that it receives from the cache in response to the read request, before it has further processed that data, e.g. written it back to the memory system. Thus, the data will be temporarily buffered in the processing unit while it is being processed, before it is written, etc.

The processing unit correspondingly in an embodiment comprises a controller configured to receive messages (notifications) from the cache that its operation is required, and to, in response thereto, trigger and control the appropriate operation of the processing unit.

The message may, for example, indicate whether the operation is a read or write or evict operation, together with an indication of the relevant data (e.g. data block), e.g. data (block) address, that the request relates to, with the controller (control unit) of the processing unit then operating to trigger the appropriate encode/decode (compression/decompression) operation and reading or writing of the identified data (block), as appropriate. Other arrangements would, of course, be possible.

In one set of embodiments the processing unit comprises a read circuit configured to read data from the memory system (e.g. via other levels of the cache hierarchy) and from the cache, and a write circuit configured to write data to the cache and from the cache to the memory system (again via other levels of the cache hierarchy, as appropriate).

In an embodiment the processing unit that makes the read request to the cache is a data encoder that is operable to compress data from the cache for writing back to the memory system. In this case, the data encoder (processing unit) is in an embodiment also operable to decompress compressed data from the memory system for writing into the cache in an uncompressed form.

Thus, in an embodiment, the processing unit is a data encoder associated with the cache, that is configured to, when data is to be written from the cache to the memory system, encode uncompressed data from the cache for storing in the memory system in a compressed format and send the data in the compressed format to the memory system for storing, and when data in a compressed format is to be read from the memory system into the cache, decode the compressed data from the memory system and store the data in the cache in an uncompressed format.

The data encoder should, and does in an embodiment, comprise an appropriate codec (data coder/decoder) or codecs operable to and configured to encode (compress) data to be written from the cache to the memory system and to decode (decompress) data to be read from the memory system into the cache.

The Applicants have recognised in particular in this regard that in the case where a cache of the cache system has an associated data encoder that is operable, in particular, to compress data from the cache for writing back to the memory system, it may be desirable for that data encoder to be able to determine whether all the data needed to write a compressed set of data from the cache back to the memory system is present in the cache, without (and before) triggering any external read to the memory system.

This would then allow, e.g., the data encoder to determine whether all the data needed for a compression operation is present in the cache or not (and to thereby trigger that compression operation or not), without causing any external memory transactions.

The operation in the manner of the technology described herein can also allow, for example, the requesting processing unit to determine whether data in the cache that is to be written back to the memory system is present in the cache and is dirty or not (and so needs writing back to the memory system or not) without triggering any external memory transactions. Thus a check can be made for the presence and suitability and need to write data back from the cache to the memory system without triggering any external memory read transactions.

Where the processing unit is a data encoder, the data encoder may use any suitable and desired encoding and decoding technique(s). Thus the data encoder may be configured to perform any suitable and desired encoding (e.g. compression) and decoding (e.g. decompression) operation(s), e.g. in dependence on the compression format(s) that may be used for the data.

In one set of embodiments the data encoder is configured to encode and decode data using a block-based compression technique.

In this case, a (and each) block (when uncompressed) in an embodiment corresponds to an integer number of cache lines of the cache the read request is made to, e.g. 4 or 8 cache lines. (Thus, in the case of 64 byte cache lines, each data block in its uncompressed form may, e.g., comprise and be stored as a 256 or 512 byte block of data.)

In this case, respective sets of plural such blocks are in an embodiment grouped together, in an embodiment with an associated (and in an embodiment correspondingly sized) "header" block, as respective "page" of the memory system (with the header for a set of data blocks (memory page) storing any suitable and desired header data that may be appropriate for the set of data blocks).

The making of a read request to the cache in the manner of the technology described herein can be triggered in any suitable and desired manner.

Thus, it may be triggered when the processing unit requires data that may be in the cache for processing (and in one embodiment that is what is done). It could also or instead, and in an embodiment also, be triggered by the processing unit receiving some form of external trigger indication that it needs to read the data from the cache. For example, when data (a cache line) is to be evicted from the cache, and that is to be done via the processing unit, then the eviction "event" could be notified (signalled) to the processing unit, with the processing unit in response to the eviction "indication" then making the appropriate read request or requests to the cache for the data (the cache line or lines) that is to be evicted.

Other arrangements would, of course, be possible.

Once the processing unit has sent the read request for the data (e.g. for the cache line) to the cache, the cache system then first determines (as discussed above) whether the requested data (the requested cache line) is present in the cache.

Whether the requested data (the requested cache line) is present in the cache can be determined in any suitable and desired manner, e.g., and in an embodiment, in accordance with the normal process for determining whether required data is present in the cache (so there is a cache "hit") or not in the cache system and data processing system in question. Thus this may involve, for example, checking tags of cache lines of the cache to determine if the requested data is present in the cache, and/or whether there is a valid entry for the data in question in the cache. Other arrangements for determining whether the requested data is present in the cache would, of course, be possible.

In the event that the requested data is present in the cache (or, if appropriate, a lower level cache) (e.g. it can be moved to the cache to which the request was made from a lower level of the cache system (as discussed above)), then the cache system operates to return the requested data to the processing unit that made the request, and invalidates the corresponding data entry (e.g., and in an embodiment, cache line) in the cache to which the request for the data was made (and in any lower level caches, as appropriate).

(Thus, the cache system operates to invalidate any data entry (cache line) that was present in the cache (for which there was a "hit" in response to the read request) and for which the data (the cache line) has accordingly been returned to the requesting processing unit.)

In an embodiment, as well as determining whether the requested data is present in the cache (whether initially or by being retrieved from another cache level), it is also determined whether the requested data in the cache is "dirty" (i.e. has been modified since it was stored in the cache). Thus in an embodiment, it is also determined whether the requested cache line, if present in the cache, is "dirty" or not.

Correspondingly, in addition to returning the read data (when present), it is also indicated to the processing unit whether the requested data (the returned line) was "dirty" or not.

Thus, in an embodiment, in the event that the requested data is present in the cache to which the request was made (or a lower cache level, where appropriate), then the cache system operates to both return the data read from the cache, and associated metadata (sideband information) for that data. The associated metadata (sideband data) in an embodiment comprises at least one of, and in an embodiment both of: an indication of whether the data was validly stored in the cache or not (i.e. whether there was a "hit" in the cache or not); and an indication of whether the read data is "dirty" (i.e. modified from its form as stored in the memory system) or not.

It would be possible for the cache system to return other associated metadata (sideband information), if desired.

For example, the cache system can also return sideband information relating to the compression (or otherwise) of the (returned) data, such as an indication of whether the data is compressed (in the memory) or not, and if the data is compressed, some additional compression state (information), such as information about the pixel format and/or pixel layout in memory (e.g. raster-order or block-interleaving patterns) and, optionally, other encoding state (configuration).

This may be particularly appropriate where the requesting processing unit is a data encoder (as discussed above). In this case (and otherwise) the "compression" state information could be stored in the cache in association with the data in the cache line in question, e.g. by storing such compression state data when a cache line is written to the cache, and then when a cache line is evicted, passing that state information to the processing unit as sideband information.

Other arrangements would, of course, be possible.

In the event that the requested data is not present in the cache (or a lower level cache, as appropriate), then the cache system returns to the requesting processing unit an indication that the requested data was not present in the cache (that there was a "miss" in the cache) (and does not return any data to the requesting processing unit).

Correspondingly, and in accordance with the technology described herein, the cache system does not send any request to (towards) the memory system for the data that was requested.

In response to the response from the cache system to the read request, the processing unit that made the read request to the cache can operate in any suitable and desired manner.

For example, when the read request returns the requested data, the processing unit could simply operate then to process that data accordingly, and/or to write that requested data back (e.g. after processing it, if appropriate) to the memory system (e.g., and in an embodiment, and where appropriate, with a first step of determining whether the data returned from the cache in response to the read request is indicated as being "dirty" (modified) or not, and then only writing data back to the memory system in the event that the returned data is "dirty").

Thus, in the case where the processing unit is a data encoder, it may first encode (compress) the data from the cache and then write it back to the memory system.

Correspondingly, in the case when the cache does not return the requested data to the requesting processing unit, the processing unit could then determine to, and send, a request for that data to (towards) the memory system. (It should be noted in this regard that in this case it would be the processing unit that made the read request to the cache that determines and triggers the request to the memory system for the data, rather than the cache system itself triggering that read request to the memory system in response to the cache "miss" on the read request to the cache.)

Thus, in an embodiment, the processing unit, in response to receiving the requested data from the cache, writes that data back to the memory system (in an embodiment after having processed it in some way, e.g. compressed it); and in response to receiving from the cache system an indication that the requested data is not stored in the cache, sends a request to the memory system for the data.

In an embodiment, the processing unit is operable to send plural related (associated) read requests to the cache (e.g., and in an embodiment, with each read request being for a respective cache line of the cache), and to then perform an appropriate operation in response to the results for that set of associated read requests (e.g., and in an embodiment, in dependence upon whether all (or any) of the read requests "hit" in the cache or not).

As discussed above, in an embodiment, the processing unit is operable to compress data that it receives from the cache in response to its read request and to return the data in a compressed form to the memory system.

In this case, as discussed above, the processing unit in an embodiment uses a block based compression scheme, and thus will in an embodiment submit a plurality of read requests corresponding to a block of data to be compressed to the cache in the manner of the technology described herein, and in dependence upon the response from the cache system to those plural read requests, either compress the returned data (as a block) and write it back to the memory system, or request further data from the memory system for combining with the data received from the cache (to form a complete block for compression), before then compressing the combined data (block) and writing the compressed (block of) data back to the memory system.

In this case therefore, the processing unit will, in effect, generate a new block of data to be compressed, comprising data read from the cache, together with some data for the block that is read from the version of the data block that is stored in the memory system. This will then allow a complete block of data to be compressed and written back to the memory by the processing unit, even in the case where only some but not all of the block is stored in the cache.

Thus, in an embodiment, a plurality of read requests (a set of plural read requests) in the manner of the technology described herein are submitted to the cache together, and when the cache returns the requested data for all of the plurality of read requests, the processing unit processes (and in an embodiment compresses) the returned data and writes it back to the memory system; but when the cache returns the requested data for only some but not all of the plurality of read requests (and one or more of the read requests returns an indication that the requested data is not stored in the cache), the processing unit requests data relating at least to the one or more of the read requests that returned an indication that the requested data was not stored in the cache (and in an embodiment relating to all of the read requests) from the memory system, and when it has the data from the memory system, combines the data returned from the cache for the read request(s) for which data was present in the cache, with data from the memory system for the one or more of the read requests that returned an indication that the requested data was not stored in the cache (that "missed" in the cache), to provide a combined set of data, and then processes (and in an embodiment compresses) the combined set of data; and writes the processed (e.g. compressed) combined set of data back to the memory system.

The above relates in particular to the situation where an entire block of data is to be processed (e.g. compressed) before being written back to the memory system.

The Applicants have further recognised that there could be situations where even if not all the read requests return data from the cache (i.e. there is a cache miss for some of the cache lines in the block), then if the block of data does not need to be processed before writing it back to the memory (e.g., and in an embodiment, the block of data is stored in an uncompressed form in the memory), then the processing unit (e.g. the data encoder) can still operate to write the data (the cache lines) that was present in the cache back to the memory, without, in that case, then needing to fetch the "missing" data from the memory before doing that.

This can be facilitated by, as discussed above, the read request to the cache system also returning appropriate sideband data, e.g., and in an embodiment, indicating whether the data should be stored in a processed (e.g. compressed) form in the memory or not. In that case, the processing unit can use the sideband data to determine whether it can write the data returned from the cache back to the memory, even though one or more of the read requests "missed" in the cache.

This will then allow the processing unit to request data from the cache and either receive that data (and an indication of whether the data should be stored in the memory in a compressed form or not), or be informed that the data is not present in the cache, without triggering and causing any read for the data to the memory system itself. This thereby accordingly allows the processing unit to check for the presence of data that it requires in the cache, and whether it can write any data that is in the cache back to the memory system, without a read to the memory system itself being triggered (and correspondingly avoiding the triggering of any read to the memory system where the processing unit can determine that such a read to the memory system itself is not necessary).

The Applicants have further recognised in this regard that performing checks for data in the cache in this way and writing the data back to the memory in an uncompressed form (where it is possible to do that), without reading any "missing" data from the memory system, may in fact use less bandwidth (since it avoids additional reads to the external memory), than, e.g. reading any "missing" data from the memory to then be able to compress the entire block of data and write the compressed block of data to the memory (in other words, the reading of the data from the memory costs more bandwidth than would be saved by compressing the overall block, such that being able to make a read request that can avoid reading data from the memory where it is possible to do that in the manner of the technology described herein provides an overall bandwidth saving).

Thus, in an embodiment, a plurality of read requests (a set of plural read requests) in the manner of the technology described herein are submitted to the cache together, and when the cache returns the requested data for only some but not all of the plurality of read requests (and one or more of the read requests returns an indication that the requested data is not stored in the cache), the processing unit determines whether the returned data is to be stored in the memory in an uncompressed form or not.

When it is determined that the returned data is to be stored in the memory in an uncompressed form, the processing unit in an embodiment then writes the returned data back to the memory system in an uncompressed form without requesting any data from the memory system.

Correspondingly, when it is determined that returned data is to be stored in the memory in a compressed form, the processing unit in an embodiment requests data relating at least to the one or more of the read requests that returned an indication that the requested data was not stored in the cache (and in an embodiment relating to all of the read requests) from the memory system, and when it has the data from the memory system, combines the data returned from the cache for the read request(s) for which data was present in the cache, with data from the memory system for the one or more of the read requests that returned an indication that the requested data was not stored in the cache (that "missed" in the cache), to provide a combined set of data, and then processes (and in an embodiment compresses) the combined set of data; and writes the processed (e.g. compressed) combined set of data back to the memory system.

The determination of whether the data is compressed (in the memory) or not is in an embodiment, as discussed above, determined from associated metadata (sideband information) that is returned with the data and that indicates whether the data is compressed in the memory or not. As will be appreciated from the above, the technology described herein relates in particular to the cache operation in response to a particular form of read request that is sent to the cache system. The technology described herein also extends to this cache operation in response to a read request per se.

Thus, another embodiment of the technology described herein comprises a method of operating a cache system configured to transfer data stored in a memory system to a processor for use by the processor when performing data processing operations and to transfer data from the processor to the memory system, the cache system comprising a cache configured to receive data from the memory system and to provide data to the processor for use when performing processing operations and to receive data from the processor for sending to the memory system;

the method comprising:
the cache system, in response to a read request for data in the cache:
determining whether the requested data is present in the cache; and
when the requested data is present in the cache, returning the data from the cache and invalidating the entry for the data in the cache; and
when it is determined that the requested data is not present in the cache, returning an indication of that, without the cache system sending a request for the data towards the memory system.

Another embodiment of the technology described herein comprises a cache system for a data processing system, the cache system:
configured to transfer data stored in a memory system to a processor for use by the processor when performing data processing operations and to transfer data from the processor to the memory system; and
comprising a cache configured to receive data from the memory system and to provide data to the processor for use when performing processing operations and to receive data from the processor for sending to the memory system;
the cache system being configured to, in response to a read request for data in the cache:
determine whether the requested data is present in the cache; and
when the requested data is present in the cache, return the data from the cache and invalidate the entry for the data in the cache; and
when it is determined that the requested data is not present in the cache, return an indication of that, without the cache system sending a request for the data towards the memory system.

As will be appreciated by those in the art, these embodiments of the technology described herein can, and in an embodiment do, include any one, or more, or all, of the features of the technology described herein described herein.

Thus, for example, the operation of the cache system in response to the read request is in an embodiment in accordance with one or more of the embodiments for that operation discussed above.

Correspondingly, the cache system in an embodiment operates in this manner in response to a particular, in an embodiment selected, in an embodiment predefined, form of read request (and that is identifiable and distinguishable from other forms of read request), such that the cache will operate in the manner of the technology described herein in response to a particular form of read request that is intended to trigger that operation, but may operate in other forms and manners in response to other forms of read request that are not in the manner of, and are not intended to trigger operation in the manner of, the technology described herein.

As will be appreciated from the above, the technology described herein is, in an embodiment, implemented in a graphics processing system comprising a memory system, a cache system, and a graphics processor (a graphics processing unit (GPU)). Data for performing graphics processing operations (e.g. to generate a render output (e.g. image to be displayed)) is stored in a memory of the memory system. The graphics processor is arranged to trigger the fetching of required data from the memory and its storing in the cache system. The graphics processor then reads required data from the cache system for performing graphics processing operations (e.g. generating the render output). The output from the graphics processing operations (e.g. the render output), once generated in this way, is then written back to the memory system via the cache system, and, in an embodiment, displayed, e.g. on a display of an electronic device, such as a phone, tablet, television, computer screen or the like.

The graphics processor (graphics processing unit) may, and in an embodiment does, implement and execute a graphics processing pipeline to perform graphics processing operations.

The graphics processing pipeline may include, and in an embodiment does include, any one or more, and in an embodiment all, of the processing stages that a graphics processing pipeline may normally include, such as, and in an embodiment, a primitive setup stage, a rasteriser, a renderer (in an embodiment in the form of or including a programmable fragment shader (a shader core)).

In an embodiment, the graphics processor (processing pipeline) also comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

In an embodiment, the graphics processing system includes a host processor that executes applications that may require graphics processing by the graphics processor. In an embodiment the system further includes appropriate storage (e.g. memory), caches, etc., as described above.

In an embodiment, the various functions of the technology described herein are carried out on a single data processing platform.

In an embodiment, the data processing system and/or processor also comprises, and/or is in communication with, one or more memories and/or memory devices that store the data described herein, and/or that store software for performing the processes described herein. The data processing system and/or processor may also be in communication with a host microprocessor, and/or with a display for displaying images based on the data generated by the processor.

The technology described herein may be implemented in any suitable system, such as a suitably configured microprocessor based system. In some embodiments, the technology described herein is implemented in computer and/or micro-processor based system.

The various functions of the technology described herein may be carried out in any desired and suitable manner. For example, the functions of the technology described herein may be implemented in hardware or software, as desired. Thus, for example, the various functional elements and stages of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., when desired.

Furthermore, any one or more or all of the processing stages of the technology described herein may be embodied as processing stage circuits/circuitry, e.g., in the form of one or more fixed-function units (hardware) (processing circuits/circuitry), and/or in the form of programmable processing circuits/circuitry that may be programmed to perform the desired operation. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuits/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of a graphics processing system.

FIG. 1 shows an exemplary graphics processing system in which the technology described herein and the present embodiments may be implemented.

The exemplary graphics processing system shown in FIG. 1 comprises a host processor comprising a central processing unit (CPU) 1, a graphics processor (graphics processing unit (GPU)) 10, a video codec 2, a display controller 3, and a memory controller 4. As shown in FIG. 1, these units communicate via an interconnect 5 and have access to an off-chip memory system (memory) 6. In this system, the GPU 10, the video codec 2 and/or CPU 1 will generate frames (images) to be displayed and the display controller 3 will then provide frames to a display 7 for display.

In use of this system, an application 8, such as a game, executing on the host processor (CPU) 1 will, for example, require the display of frames on the display 7. To do this the application 8 will send appropriate commands and data to a driver 9 for the graphics processing unit 10 that is executing on the CPU 1. The driver 9 will then generate appropriate commands and data to cause the graphics processing unit 10 to render appropriate frames for display and store those frames in appropriate frame buffers, e.g. in main memory 6. The display controller 3 will then read those frames into a buffer for the display from where they are then read out and displayed on the display panel of the display 7.

As part of this processing, the graphics processor 10 will read in data, such as textures, geometry to be rendered, etc. from the memory 6, process that data, and then return data to the memory 6 (e.g. in the form of processed textures and/or frames to be displayed), which data will then further, e.g. as discussed above, be read from the memory, e.g. by the display controller 3, for display on the display 7. Thus there will need to be transfer of data to and from the graphics processor 10 (in particular to and from the processing cores of the graphics processor 10) and the memory 6.

In order to facilitate this, and to reduce the amount of data that needs to be transferred to and from memory during graphics processing operations, the data may be stored in a compressed form in the memory.

As the graphics processor 10 needs to operate on the data in an uncompressed form (and will produce data in an uncompressed form), this accordingly means that data that is stored in the memory in a compressed form will firstly need to be decompressed before being processed by the graphics processor. Correspondingly, data produced by the graphics processor 10 will first need to be compressed before being (finally) stored in the memory 6.

The present embodiments relate in particular to improved techniques for performing such compression and decompression of data between the memory 6 and the graphics processor 10.

Figure 2:
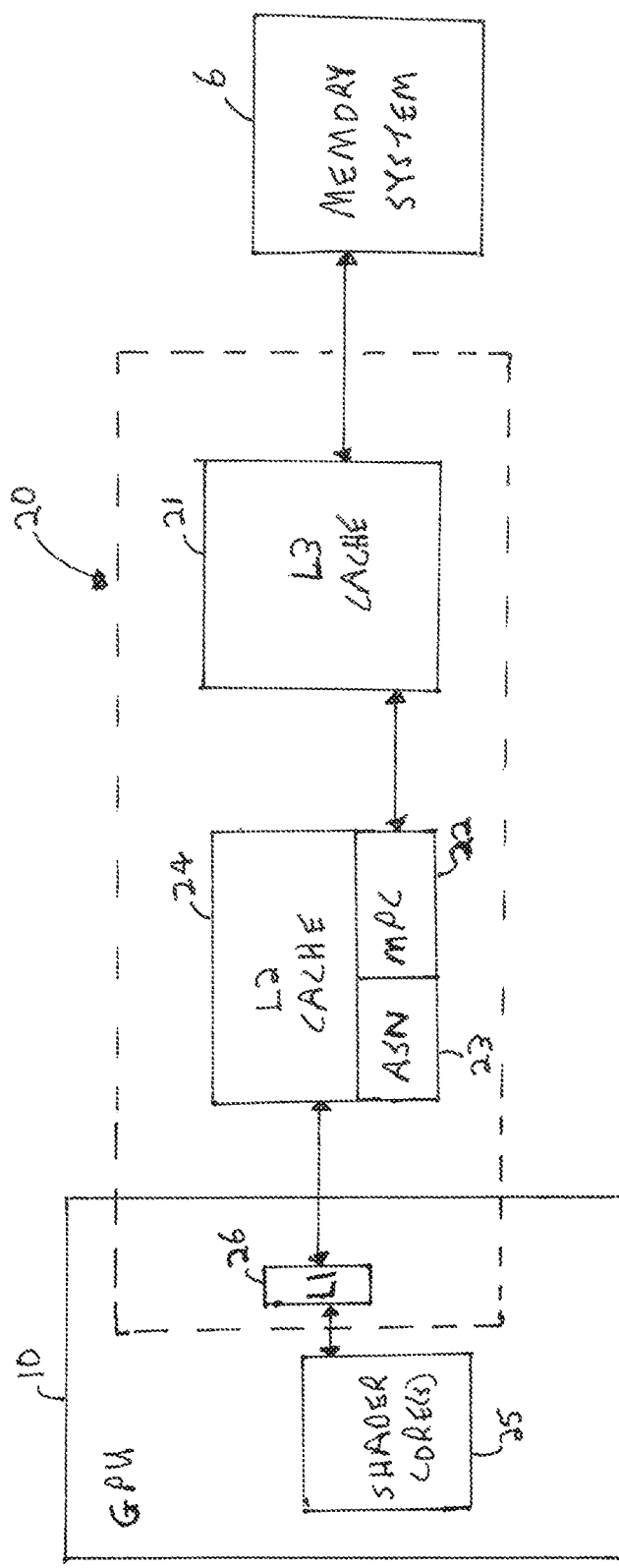
FIG. 2 shows schematically an embodiment of the technology described herein.

FIG. 2 shows schematically and in more detail the elements of the graphics processing system that are relevant to the operation of the present embodiments, and in particular to the transferring of data to and from the memory system 6 to the graphics processor 10 in a compressed form. As will be appreciated by those skilled in the art there may be other elements of the system, etc., that are not shown in FIG. 2.

FIG. 2 shows the memory system 6 and the graphics processor 10. As shown in FIG. 2, in between the memory system 6 and the graphics processor 10, there is a cache system 20 that is operable to transfer data from the memory system 6 to the graphics processor 10 (and in particular to the processing cores (shader cores) 25 of the graphics processor 10), and conversely to transfer data produced by the processing cores 25 of the graphics processor 10 back to the memory 6.

The cache system shown in FIG. 2, is illustrated as comprising three cache levels, an L3 cache 21 that is closer to the memory 6, an L2 cache 24 that is closer to the graphics processor 10, and an L1 cache 26 that is associated with the shader cores 25 of the graphics processor 10 (and from which the data is provided to the shader cores 25). Other cache hierarchy arrangements would be possible, such as comprising only a single cache level (the L2 cache), or only two cache levels, or more than three cache levels, if desired.

As shown in FIG. 2, in this embodiment data is transferred from the memory system 6 to the L3 cache 21, then from the L3 cache 21 to the L2 cache 24, then from the L2 cache 24 to the L1 cache 26, and from the L1 cache 26 to the shader cores 25 (and vice-versa).

In order to facilitate the handling of compressed data from the memory system 6 (and for returning compressed data to the memory system 6) where that is required, as shown in FIG. 2, the L2 cache 24 has associated with it a processing unit in the form of a data encoder 22 (in the form of a memory page compression unit (MPC)).

As will be discussed further below, this data encoder is operable to decompress data received from the memory system 6 via the L3 cache 21 before storing that data in an uncompressed form in the L2 cache 24 for use by the shader cores 25 of the graphics processor, and, conversely, to compress data that is to be evicted from the L2 cache 24 prior to writing that data back to the memory system 6 (again via the L3 cache 21). The operation of this data encoder (MPC) 22 will be discussed in more detail below.

The L2 cache 24 also includes, as shown in FIG. 2, an appropriate interconnect 23 (in this case in the form of an asynchronous switch network) for transferring data between the L2 cache 24 and the L1 cache 26 (shader cores 25).

In order to facilitate operation between the L2 cache and the data encoder (MPC) 22, each cache line in the L2 cache has associated with it appropriate flags and data to indicate whether the cache line should be handled by the data encoder (MPC) 22 or not.

Figure 11:
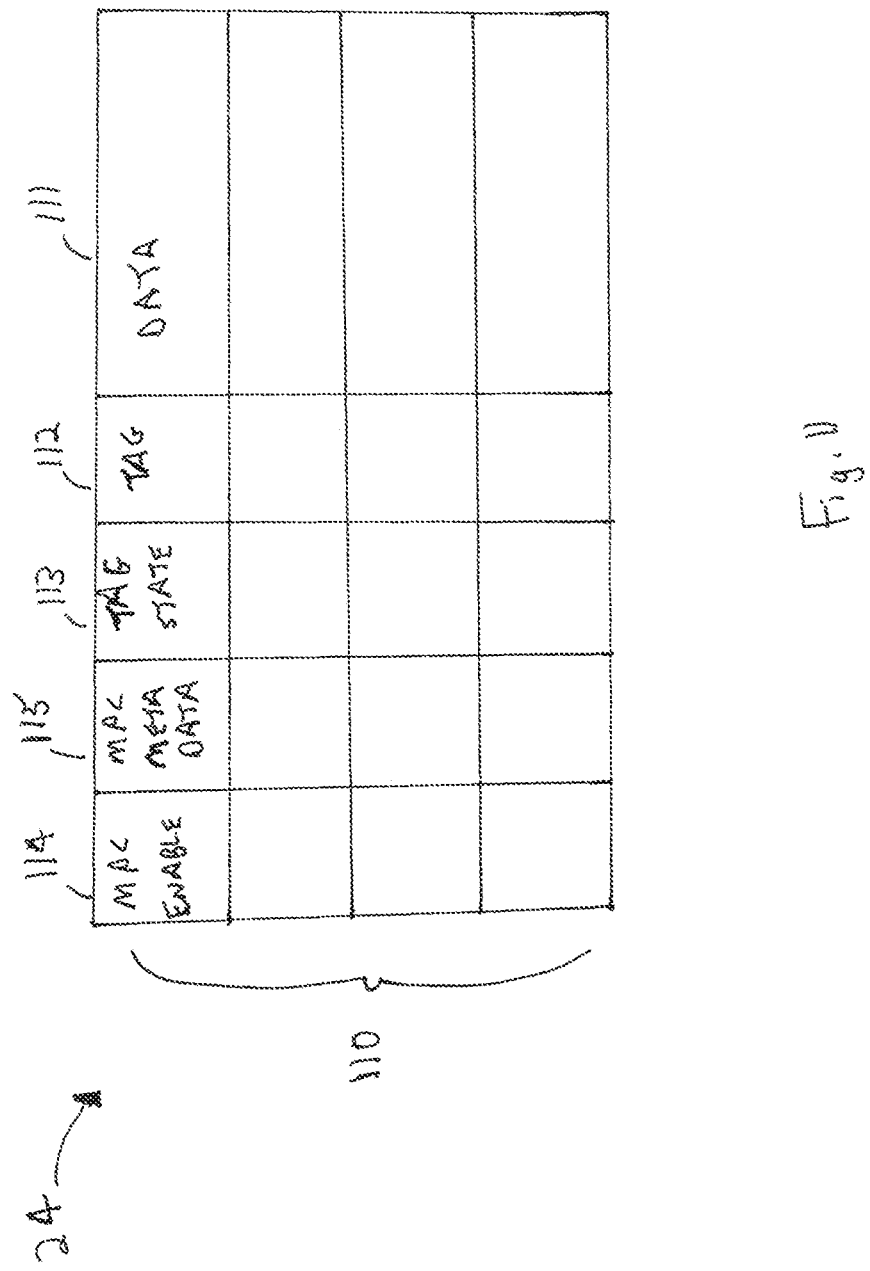
FIG. 11 shows the arrangement of the cache in an embodiment of the technology described herein.

FIG. 11 illustrates this, and shows an exemplary set of plural cache lines 110 of the L2 cache 24, each storing respective data 111 and having a respective tag 112 identifying the data in the cache line and a set of tag state information 113, such as flags indicating whether the cache line is valid or not, is dirty or not, is free or not, etc.

In addition, as shown in FIG. 11, each cache line in the L2 cache also has an "MPC enable" flag 114 that indicates whether the cache line is to be handled and processed by the data encoder (MPC) 22 or not. Correspondingly, each cache line has a field 115 for storing any required metadata needed by the data encoder (MPC) 22 for its operations when handling the cache line, such as an indication of whether the data in the cache line is stored in the memory in a compressed or uncompressed form, and if it is compressed, the number of memory transactions needed to fetch the compressed data.

Figure 3:
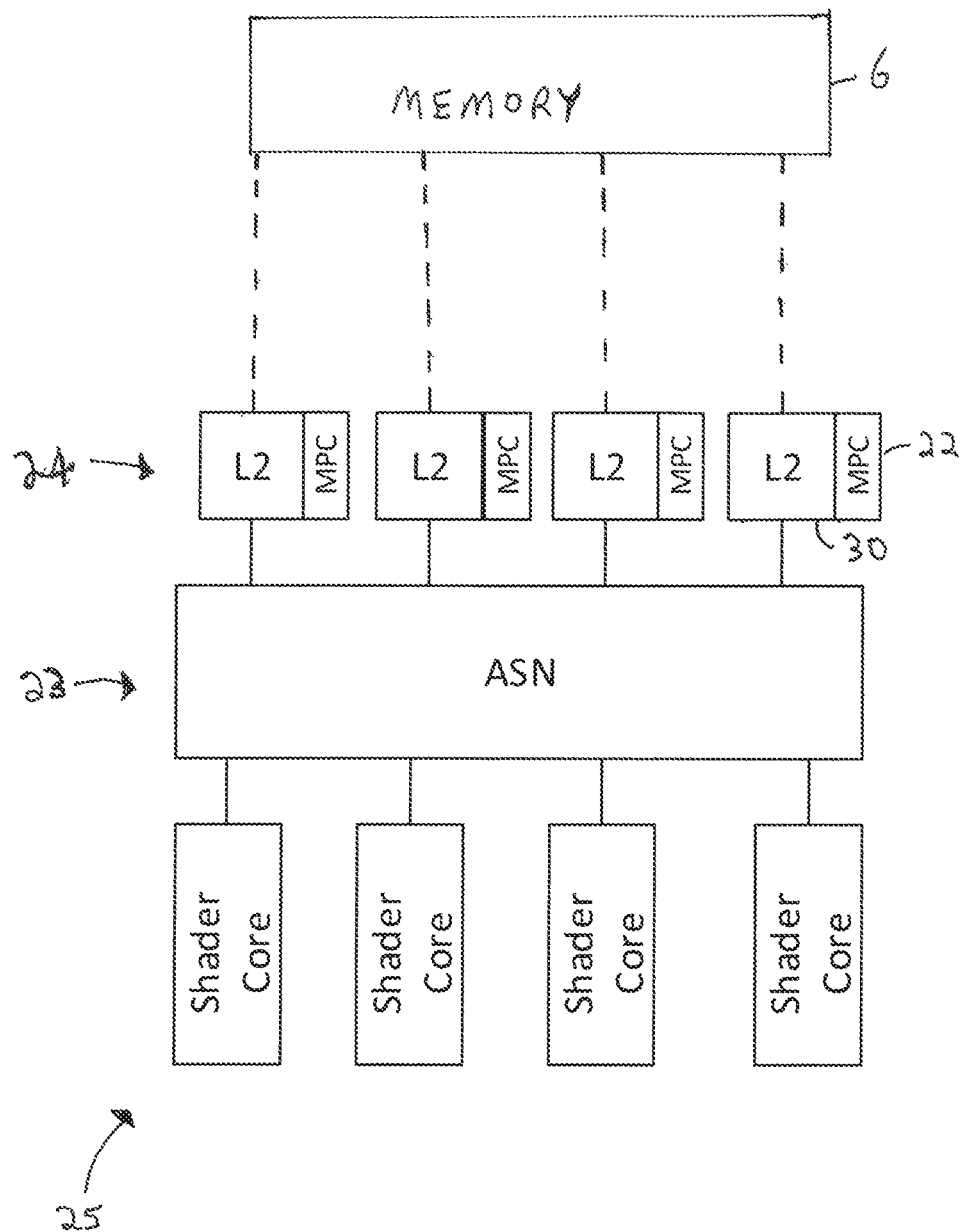
FIG. 3 shows an embodiment of the cache system of the graphics processing system of FIG. 2 in more detail.
Figure 4:
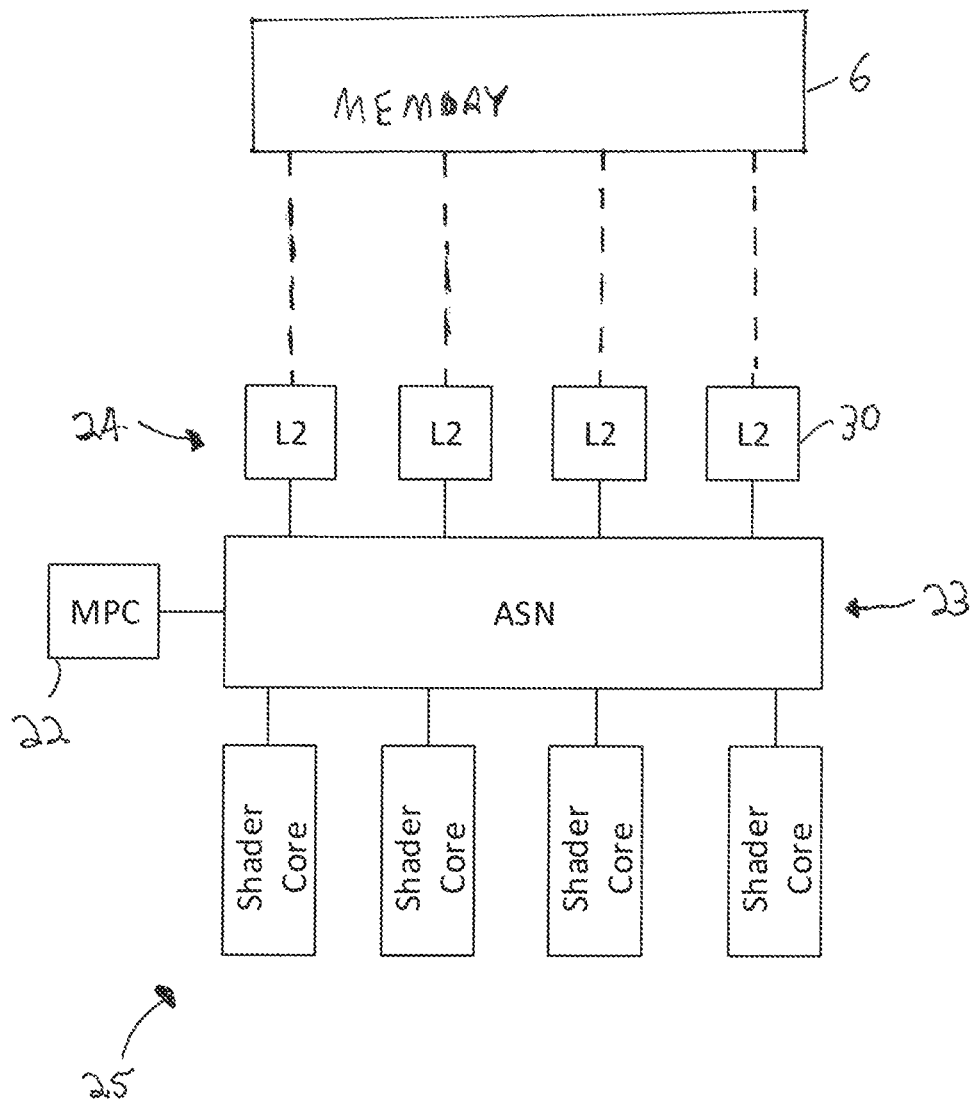
FIG. 4 shows another embodiment of the cache system of the graphics processing system of FIG. 2 in more detail.

FIGS. 3 and 4 show the arrangement of the L2 cache 24, data encoder (memory page compression unit) 22, and shader cores 25 in two possible implementation arrangements of the present embodiments in more detail.

In both FIGS. 3 and 4, the L2 cache 24 is shown as being configured as respective separate physical cache portions (slices) 30. In the arrangement in FIG. 3, each respective L2 slice has its own associated data encoder 22. In the arrangement shown in FIG. 4, rather than each L2 cache slice 30 having its own associated data encoder 22, there is a single data encoder 22 that operates for all the L2 cache slices 30 that is instead coupled to and associated with the interconnect 23 that acts between the L2 cache 24 and the shader cores 25 of the graphics processor.

Figure 5:
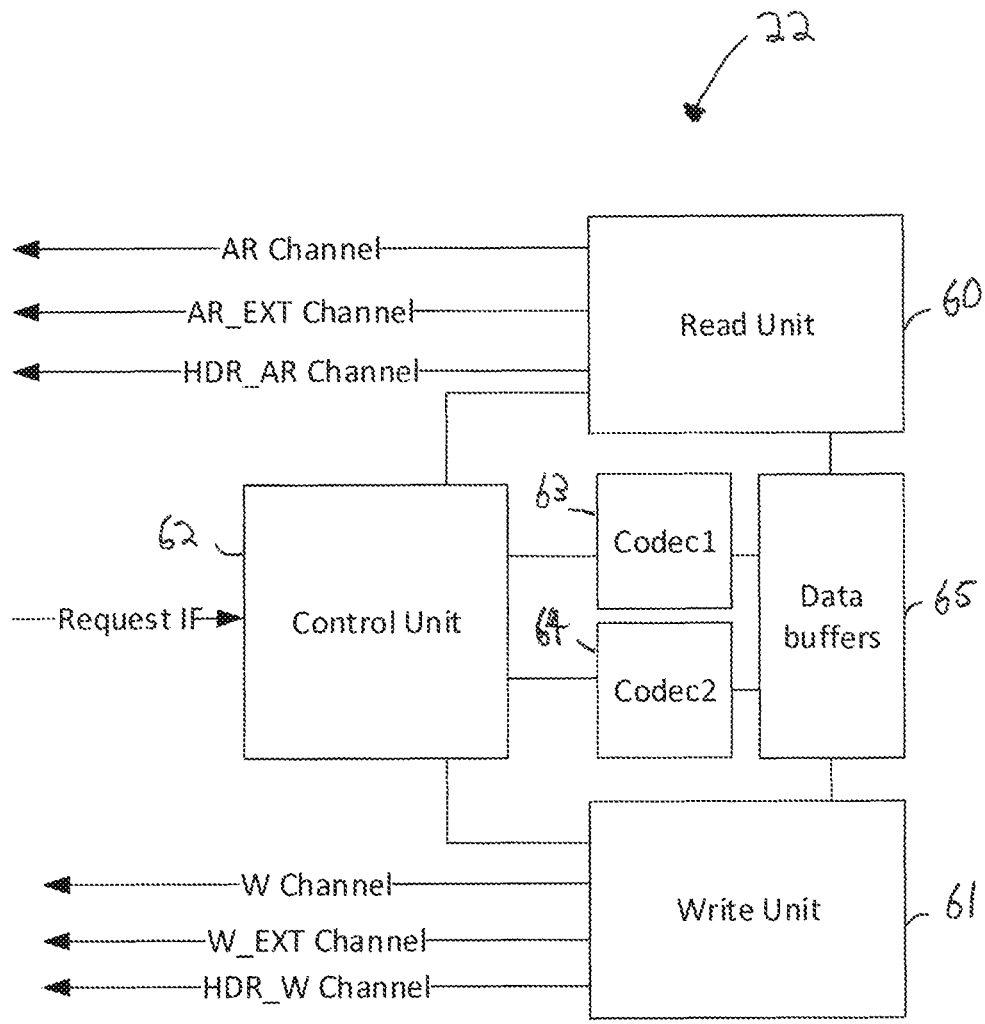
FIG. 5 shows an embodiment of the data encoder in more detail.

FIG. 5 shows an embodiment of the data encoder (memory page compression unit) 22 in the present embodiments. As shown in FIG. 5, the (and each) data encoder includes respective read 60 and write 61 units (circuits) that are operable to, respectively, read data from the L2 cache and the memory system, and write data to the L2 cache and to the memory system. The data encoder 22 also includes an appropriate control unit (circuit) 62 that receives read and write requests from the shader cores and the L2 cache controller and controls the data encoder 22 to respond to those requests accordingly and appropriately.

As shown in FIG. 5, the data encoder 22 also includes one or more codecs 63, 64 and a set of data buffers 65 for temporarily storing data in the data encoder 22 while that data is processed and/or while waiting to write that data to the L2 cache or the memory system.

The data encoder 22 can include any desired number of codecs, e.g. that are each respectively operable to perform a different encoding (compression) scheme. For example, one codec may be configured to perform an appropriate variable rate compression scheme, with the other codec being configured to perform an alternative, e.g. fixed rate compression scheme.

Other arrangements would, of course, be possible.

In the present embodiments, the data (e.g. data arrays) that are being processed by the graphics processor are stored as respective blocks of data (blocks of the data array) in the memory 6, with each data block being stored in the memory 6 in a compressed form, but being stored in the L2 cache 24 in an uncompressed form for use by the shader cores 25 of the graphics processor 10.

Figure 6:
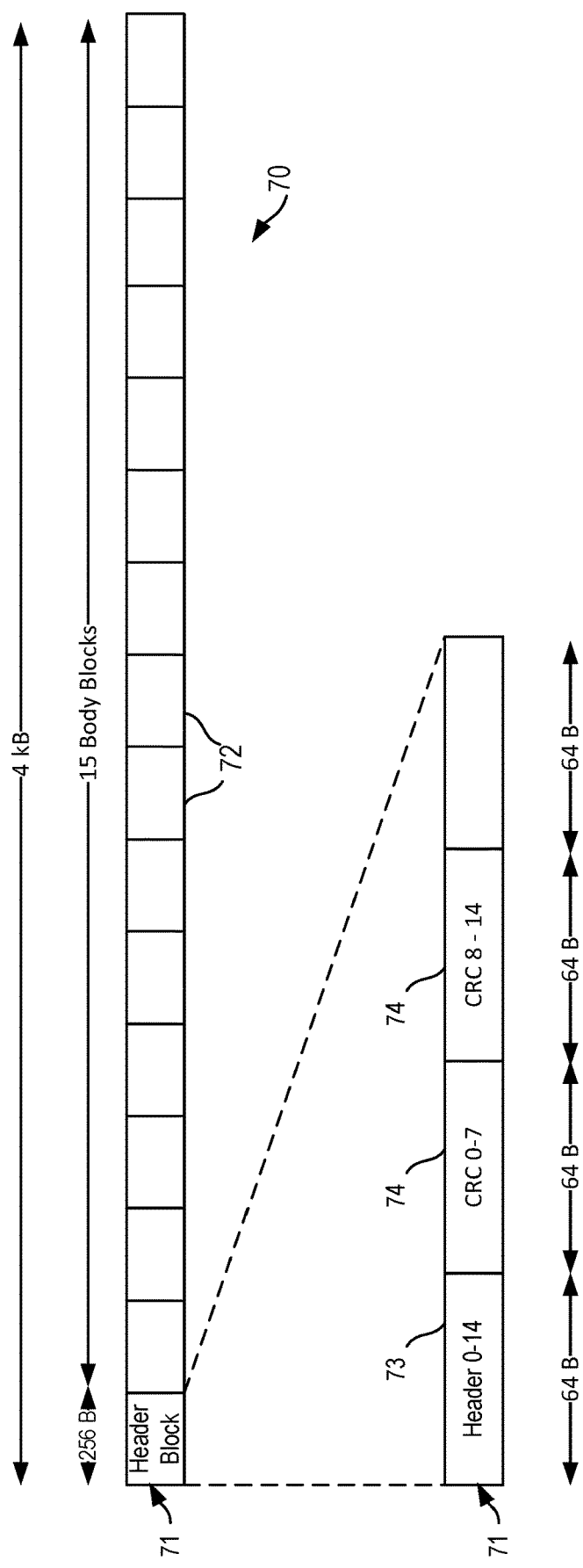
FIG. 6 shows the arrangement of data used in embodiments of the technology described herein.

To facilitate this operation, in the present embodiments the data arrays are stored and organised as respective sets of plural blocks of data which are then associated with a respective header block for the set of blocks of data in question. FIG. 6 illustrates this, and shows a set 70 of fifteen data blocks 72 that will be stored together with an associated header block 71 for the set 70 of data blocks.

In the present embodiment, in order to further facilitate operation in the manner of the technology described herein, each data block 72 corresponds in its uncompressed form to an integer number of, in this case four, cache lines of the L2 cache 24, such that in the case where each cache line comprises 64 bytes, each separate data block will comprise 256 bytes.

As shown in FIG. 6, the header block 71 correspondingly comprises four cache lines worth of data and so again comprises 256 bytes.

The fifteen data blocks together with their header block accordingly comprise a 4 kilobyte memory page (and will be stored in and fit in the same memory page). This then facilitates addressing of the data blocks, as they will all use the same single, physical memory address.

Other configurations that achieve this kind of arrangement could be used if desired, e.g. depending upon the relative cache line and memory page sizes used in the graphics processing system in question.

As shown in FIG. 6, the header block 71 for a set 70 of data blocks may include any suitable and desired header data. This may comprise, for example, an indication 73 for each respective data block of: whether that data block is stored in a compressed form (and some compression state needed for decoding (decompressing) the block (if desired)), and/or of how many memory transactions (bursts) will be needed to fetch the data for that block from the memory (in its compressed form). (This latter may be desirable because although each data block is configured to occupy an integer number cache lines in its uncompressed form, when compressed, particularly if using a variable rate compression scheme, the data may compress to a different (and smaller) number of cache lines (and thus corresponding memory transactions), and that may differ from block-to-block. Thus it is useful if the header block indicates how many memory transactions are needed to fetch the complete set of compressed data for a (and each) data block from the memory.)

As shown in FIG. 6, in the present embodiments, the header block 71 also includes a respective content-indicating signature 74, in the form of a CRC, for each data block that the header block relates to.

Any other suitable and desired form of header data can also be included in the header block 71, as desired.

Figure 7:
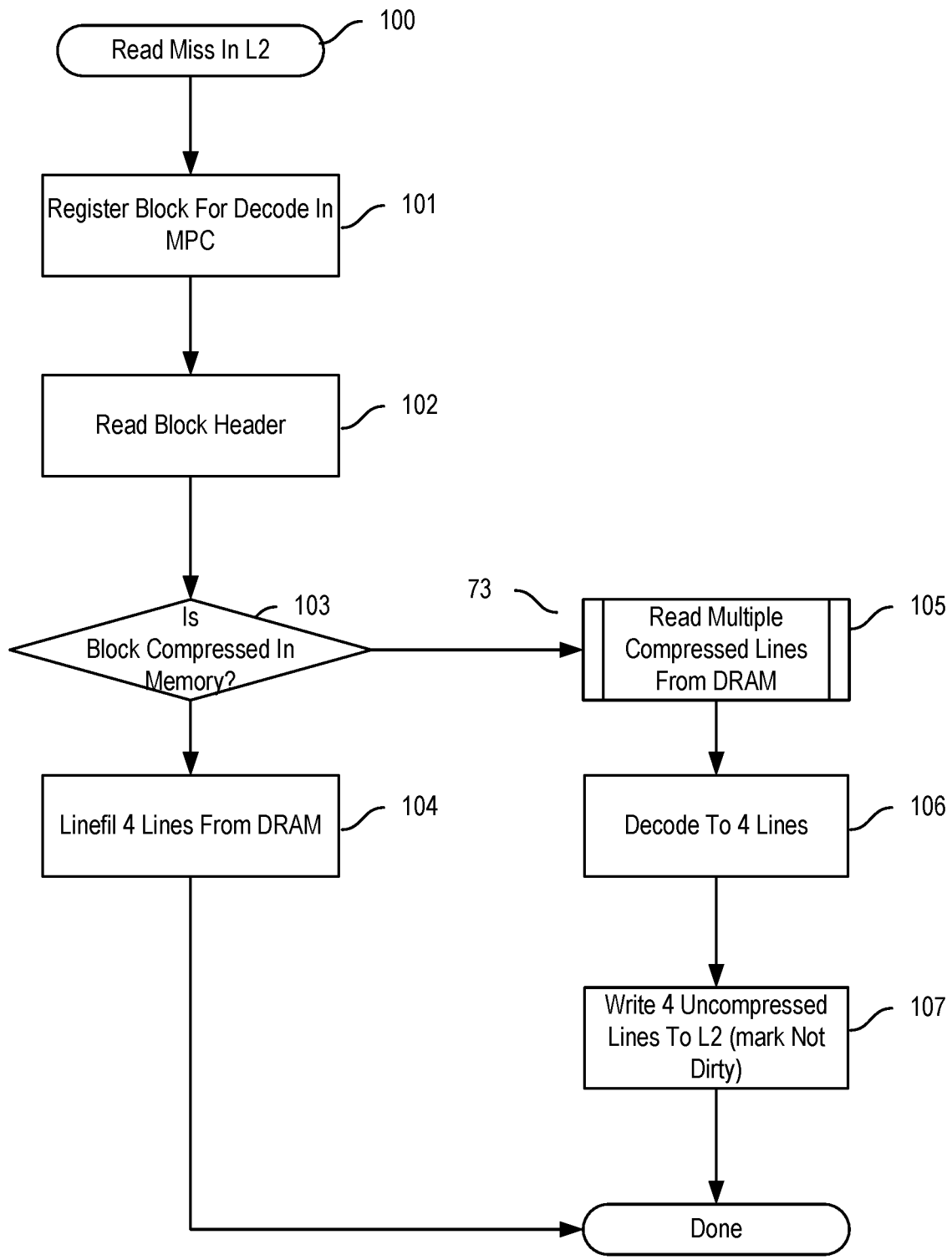
FIG. 7 is a flowchart showing the operation of reading data from the cache.
Figure 8:
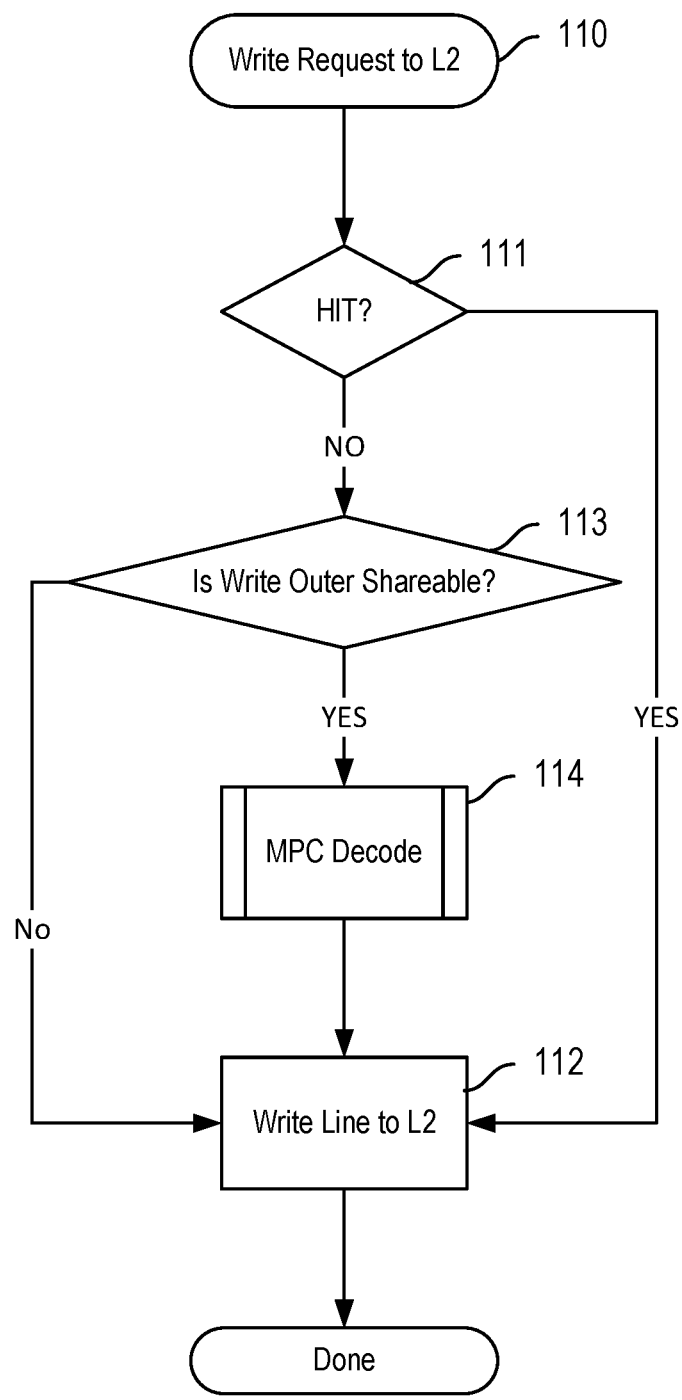
FIG. 8 is a flowchart showing the operation of writing data from the graphics processor to the cache.
Figure 9:
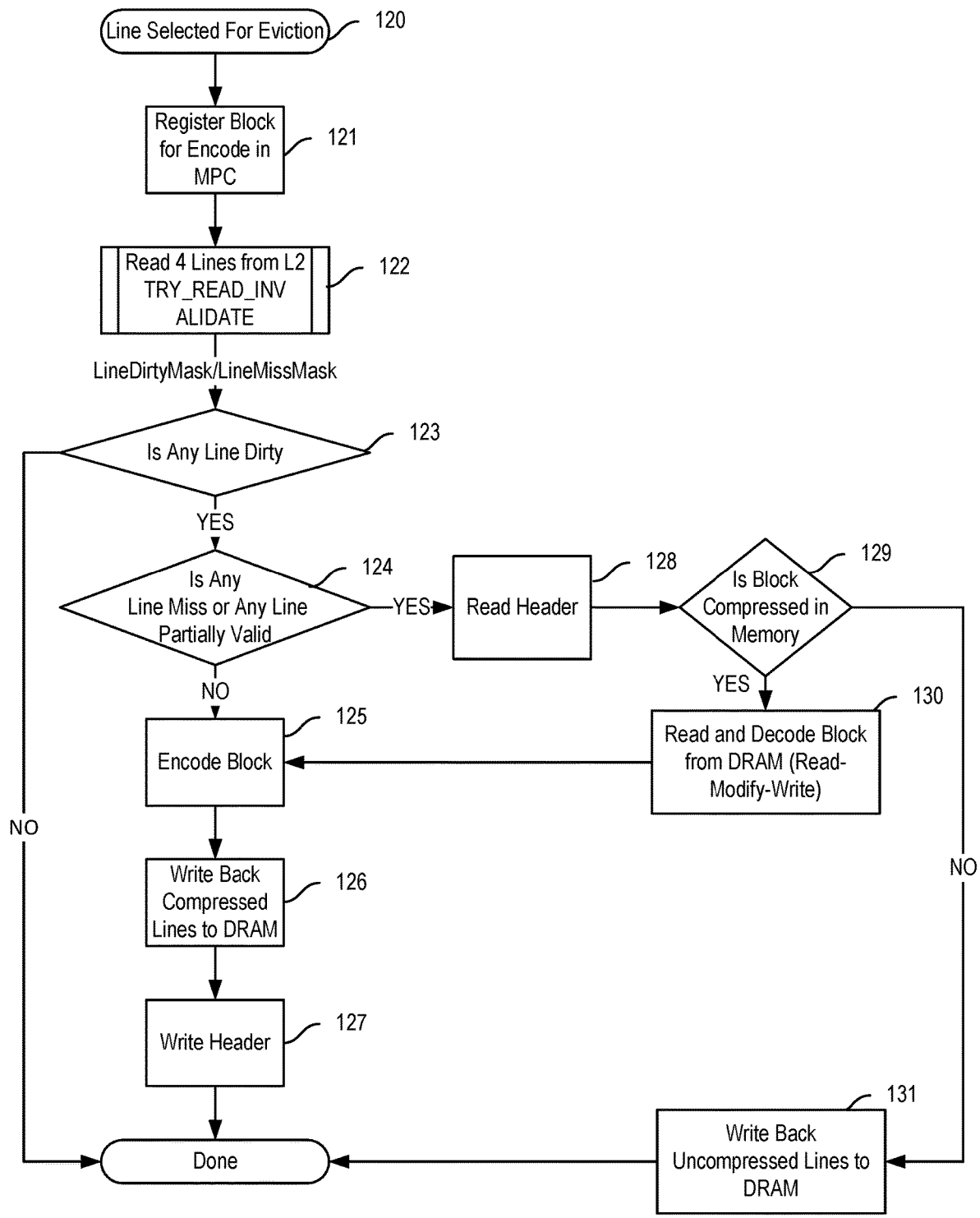
FIG. 9 is a flowchart showing the operation of evicting data from the cache in an embodiment of the technology described herein.
Figure 10:
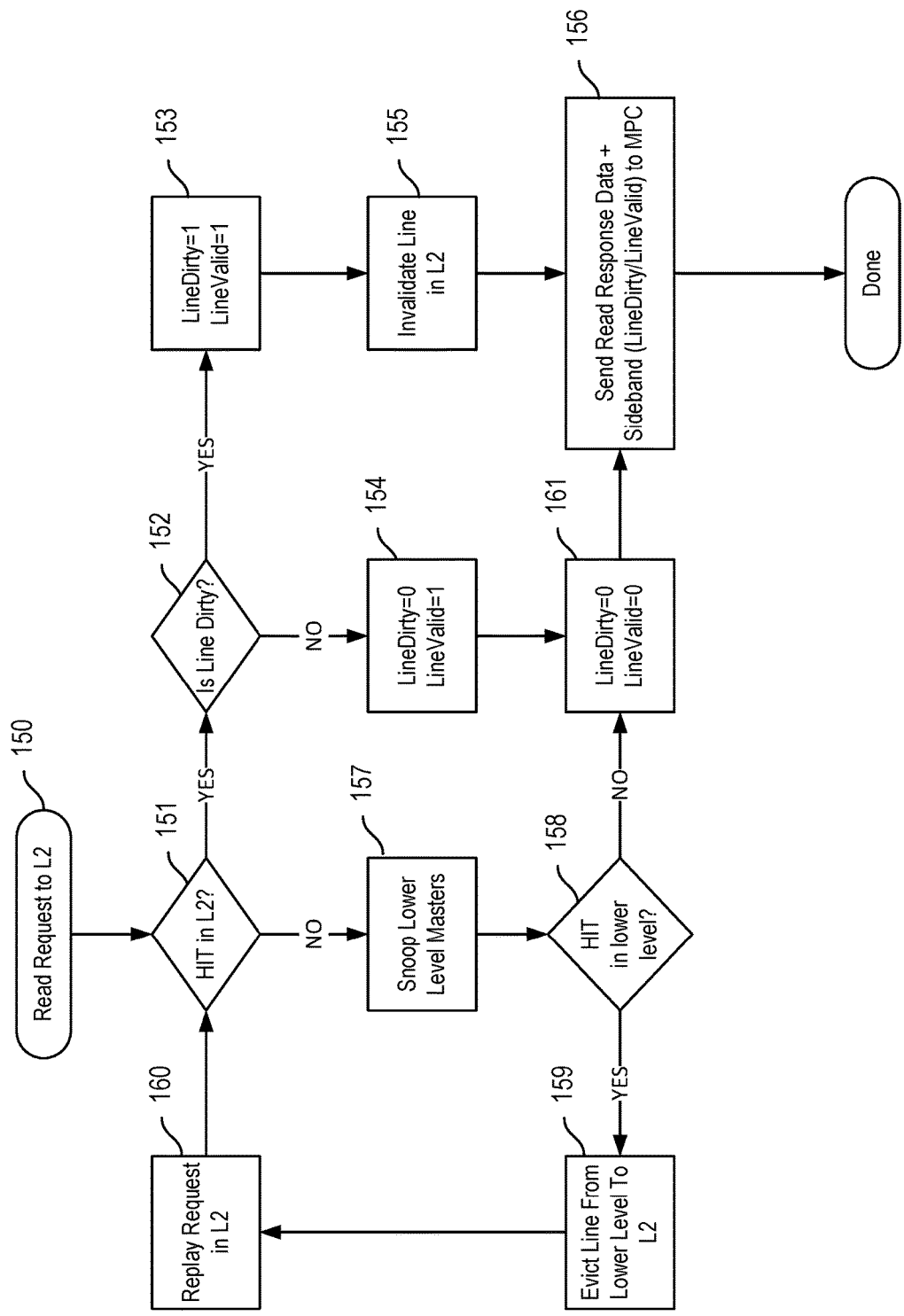
FIG. 10 is a flowchart showing the reading of data from the cache when evicting data from the cache in an embodiment of the technology described herein.

FIGS. 7, 8, 9 and 10 show the operation of the present embodiments when reading data from, writing data to, or evicting data from, the L2 cache 24. FIG. 7 shows the operation when data is being read from the L2 cache 24 for use by a shader core 25 of the graphics processor. FIG. 8 shows the operation when writing data from a shader core 25 to the L2 cache 24. FIGS. 9 and 10 show the operation when evicting data from the L2 cache 24 back to the main memory system 6.

FIG. 7 shows the operation when data is being read from the L2 cache 24 for use by a shader core 25 of the graphics processor.

When a shader core 25 needs data for a processing operation that it is to perform, it will attempt to read that data from the L2 cache 24, by issuing a read request to the L2 cache.

If the data is present in the L2 cache (i.e. there is "hit" in the L2 cache), then the shader core can read that data from the L2 cache in the normal manner and process that data accordingly.

However, if the data is not present in the L2 cache (i.e. there is a read "miss" in the L2 cache), then the data needs to be fetched from the memory system 6 into the L2 cache 24 for use by the shader core 25 of the graphics processor 10.

In this case, the L2 cache (the controller for the L2 cache) will first determine whether the data that needs to be fetched from the memory system into the L2 cache for use by the shader core is indicated to be handled by the data encoder 22 or not (as needing processing by the data encoder 22 or not). If not, then the L2 cache controller will request and fetch the data from the memory system 6 into the L2 cache in the normal manner.

On the other hand, if the data is indicated as to be processed by the data encoder 22, then the L2 cache (the cache controller) registers the required data for handling by the data encoder 22, for the data encoder 22 to then fetch and process the data and write it into the L2 cache 24 appropriately.

This operation is performed in the present embodiments as shown in FIG. 7.

Thus, as shown in FIG. 7, when there is a read miss in the L2 cache (step 100), and the "missing" data is to be handled by the data encoder 22, the L2 cache 24 (a controller for the L2 cache) notifies (signals) the data encoder 22 that the entire block of data that includes the data that is required (that triggered the read miss) requires fetching and decoding and storing in the L2 cache (step 101).

The data encoder 22 will then first read the header block 71 for the set 72 of data blocks (the memory page) that the block to be fetched and decoded belongs to (step 102), and determine therefrom whether the required data block is stored in compressed form in the memory or not (and if it is stored in compressed form in memory, how many external memory transactions are needed to fetch the compressed data) (step 103).

In the present embodiments, the header data (header blocks) is cached locally in the data encoder 22. Thus, when there is a read miss in the L2 cache which registers a decode operation in the data encoder 22, the data encoder 22 first checks if the appropriate header data is present in the header cache which resides in the data encoder 22. If there is a "hit" then the process can directly proceed. If there is a "miss" in the header cache, the data encoder 22 will first read the header data (cache line) from the memory (and cache it in the data encoder 22 for later use by other blocks in the same page).

In the case where the data block is stored in an uncompressed form in the memory 6, then the data encoder 22 will simply operate to read the complete uncompressed block from the memory and store that uncompressed block as a complete block in (four) cache lines of the L2 cache (step 104).

On the other hand, when it is determined that the data block that is required has been stored in a compressed form in the memory, then the data encoder 22 operates to read the appropriate amount of compressed data representing the block from the memory (step 105) (e.g. based on an indication in the header data of how many memory transactions are needed to fetch the complete block). The read compressed data will be stored in the data buffers 65 of the data encoder 22 while it is processed by the data encoder 22 (and before it is written to the L2 cache 24).

The data encoder 22 will then operate to decode the fetched compressed data to thereby provide four lines of uncompressed data (as in the present embodiments each uncompressed data block corresponds to four cache lines worth of data) (step 106), and then write the four uncompressed lines of data to the L2 cache (step 107) (and, if appropriate, mark the so-written lines as not "dirty").

Thus the data encoder 22 will operate to read a compressed data block from the memory 6 but then decode that data and write the data in the block in an uncompressed form into the L2 cache 24 for use by the graphics processor 10.

It should also be noted here that in this operation as shown in FIG. 7, irrespective of how much data is actually required to be written into the L2 cache from the memory, the data is always written into the L2 cache 24 from the memory 6 as complete blocks. This helps to ensure synchronisation between the memory and the data in the L2 cache.

(As will be appreciated, the operation of loading the data into the L2 cache may comprise first allocating appropriate lines in the L2 cache for the data, and/or evicting lines of data already present in the L2 cache so as to provide available lines for storing the new data block. The cache line allocation, eviction, etc., processes can be performed in any suitable and desired manner, such as in accordance with the normal cache operation in those respects for the graphics processing system in question (subject to the operation in the manner of the technology described herein).)

FIG. 8 shows the operation in the present embodiments where data is to be written to L2 cache 24 from a shader core 25. This may be the case where, for example, a shader core has performed some processing of data from a data array from the memory 6, and now wishes to return the modified data back to the memory system. In this case, the data from the shader core 25 will first be written to the L2 cache 24 and then written therefrom back to the memory system 6 as required.

When writing data from the shader core 25 to the L2 cache 24, the write request from the shader core will be sent to the L2 cache 24.

Thus, as shown in FIG. 8, the write process starts with an appropriate write request from the shader core 25 to the L2 cache (step 110).

It is then determined whether there is already a line (an entry) in the L2 cache for the data that is being written (i.e. whether there is a write "hit" in the L2 cache or not (step 111)).

In the event that there is a hit in the L2 cache 24 for the write request (i.e. a line for the data that is being written already exists in the L2 cache), then the new data from the shader core 25 can simply be written to the appropriate line in the L2 cache accordingly (step 112).

As shown in FIG. 8, on the other hand, in the event of a miss in the L2 cache 24 on a write request, it is then determined whether the data being written could be subject to external reads and snooping in the L2 cache (step 113).

This may be determined, e.g., from an appropriate indication (flag) in the MMU page tables (which indication may, e.g., be propagated with the write transaction to the L2 cache where it will be checked). The data being written may be flagged as being subjected to external reads and snooping in the L2 cache in the case where the memory page in question is shareable with other components in the system beyond the graphics processor itself, such as a CPU or CPUs, such that the memory page is coherent with other components in the system (and not merely coherent internally within the graphics processor (the graphic processor's L2 cache and lower level caches) only). (In the case where the memory page is coherent beyond the graphics processor itself, then the data may be subjected to external reads and snooping in the L2 cache of the graphics processor from those other components (the cache systems of those other components) in the system for that purpose.)

When it is determined that the data being written is not subject to external reads and snooping in the L2 cache, then the new data can simply be written to the L2 cache (once there is a cache line allocated for that data) (step 112).

On the other hand, when it is determined that the data being written to the L2 cache is to be subject to external reads and snooping of the L2 cache, then rather than simply writing the new data to the L2 cache on its own, the data encoder 22 operates to fetch and decompress the remaining data for the block of data that the new data being written to the L2 cache relates to from the memory system 6 (step 114), and then combines that data retrieved from the memory system with the new data to be written to the L2 cache 24 in order to write a complete block of (uncompressed) data (that includes the new data) to the L2 cache (step 112).

This has the effect of enhancing system coherency, by ensuring that a complete block of data is stored in the L2 cache, even if the write request itself only relates to part of a block of data. This will then avoid, for example, any external snoop transactions for the block of data in question to the L2 cache having to depend on external reads (in addition to the read of the L2 cache) (which may otherwise, e.g., risk deadlocking on the interconnect).

(Again, in the case where there was a miss in the L2 cache on a write request, the write operation will first act to allocate lines in the L2 cache for storing the new data (and, e.g., the complete block of data where appropriate), before that data is written to the L2 cache. The new data to be written to the L2 cache and any other block data retrieved from the memory may be appropriately buffered while processing that data and pending the writing of that data to the L2 cache.)

FIG. 9 shows the operation in the present embodiment where data is to be evicted (written) from the L2 cache 24 back to the memory system 6.

As shown in FIG. 9, this process will start when a line of the L2 cache is selected for eviction (and triggered to be evicted) (step 120).

In this case, the L2 cache (the controller for the L2 cache) will first determine whether the line to be evicted from the L2 cache is indicated to be handled by the data encoder 22 or not (as needing processing by the data encoder 22 or not). If not, then the L2 cache controller will evict the line from the L2 cache to the memory system 6 in the normal manner.

On the other hand, if the cache line (data) is indicated as to be processed by the data encoder 22, then the L2 cache (the cache controller) registers the entire block of data that includes the data (line) that is being evicted for handling by the data encoder 22, for the data encoder 22 to then read those cache lines from the L2 cache, process the block of data and write it back to the memory 6 appropriately (step 121).

The data encoder 22 will then attempt to read all the lines relating to the block in question (so including the line selected for eviction but also any cache lines for the block that have not been selected for eviction) from the L2 cache (step 122).

Thus, as shown in FIG. 9, in the present embodiment, as each data block that is to be compressed comprises four compressed cache lines, the data encoder 22 will attempt at step 122 to read four cache lines (four lines of data) from the L2 cache, including at least the line that was selected for eviction.

To do this, the data encoder 22 submits four read requests (one for each cache line) to the L2 cache in accordance with and in the manner of the technology described herein.

FIG. 10 shows the read request process and the response to that process from the cache and the cache system in the present embodiments in more detail. The operation shown in FIG. 10 is performed for each read request (and for each cache line) that is requested from the L2 cache by the data encoder 22.

As shown in FIG. 10, when a read request to read a cache line from the L2 cache is submitted to the L2 cache (step 150), the L2 cache (its controller) first determines whether the requested cache line (data) is present in the L2 cache or not (step 151).

If the requested cache line is present in the L2 cache (there is a hit in the L2 cache), then the L2 cache (cache controller) determines whether the cache line is marked as being dirty (modified) or not (step 152).

Depending upon whether the cache line is indicated as being dirty or not, the L2 cache then generates appropriate sideband information (metadata) for the read request, indicating that the cache line is present (there was a hit in the L2 cache) and either dirty (step 153) or not (step 154). The "hit" cache line is then invalidated in the L2 cache (step 155) so that it is available for re-use. (This is done as soon as the L2 cache read operation is completed, so the lines are available for re-use at that point (and before the eviction procedure in the data encoder 22 has been completed.)

The L2 cache then returns the data from the cache line together with the "sideband" "dirty" and "hit" indications to the data encoder 22 (step 156).

The data (the cache line) that is returned to the data encoder 22 and the corresponding sideband information/metadata is appropriately stored in the data buffer 65 of the data encoder 22, pending processing of that data and the writing of the data back to the memory 6.

On the other hand, as shown in FIG. 10, in the event that the requested cache line is not present in the L2 cache (there is a "miss" in the L2 cache), then in the present embodiment, where there are lower level caches, such as an L1 cache, also present in the cache system, the L2 cache (its controller) triggers a snoop to the lower level caches (step 157) to determine if the requested data (cache line) is present in any lower level caches (step 158).

When the requested cache line is present in a lower level cache (there is a hit in a lower level cache), then the cache line in question is evicted from the lower level up to the L2 cache (step 159) (and invalidated in the lower level), and the read request is replayed in the L2 cache to thereby retrieve the cache line that should now be present in the L2 cache (step 160). In this case, when the read request is replayed, it should then hit in the L2 cache at step 151 and the operation will then proceed as discussed above in the event of a hit in the L2 cache.

On the other hand, where a cache line is not present in a lower level cache either (i.e. there is a miss in the lower level cache at step 158), then it can be determined that the requested cache line is not present in the L2 cache or lower, and so an appropriate metadata/sideband data response indicating that a cache line is not present (there was a miss) is generated (step 161) and returned to the data encoder 22 (step 156).

Correspondingly, in this case, the sideband/metadata indicating that the requested data (cache line) was not present in the L2 cache (or lower) is stored in the data buffers 65 of the data encoder 22 for use by the data encoder 22 when evicting data from the L2 cache and writing the data back to the memory 6.

This operation is performed for each cache line that has been requested by the data encoder 22 (so in this case for each of four cache lines making up a block of data to be compressed and returned to the memory system).

Thus, in response to the plural read requests to the L2 cache for the cache lines making up a data block to be written back to the memory, the data encoder 22 will, as well as receiving the data for any cache line that was present in the L2 cache (or lower), also receive an indication of which cache lines that it has attempted to read from the L2 cache are marked as being "dirty" (i.e. have been modified since they were loaded into the cache from the memory), and those lines where the read "missed" in the L2 cache (i.e. those lines for the block in question that are not present in the L2 cache (or a lower level cache)).

The lines that are read from the L2 cache are also invalidated (marked as being invalid) (so available for re-use).

The effect of the operation shown in FIG. 10 is that the data encoder 22 can request data from the L2 cache (and lower) and either receive that data (and an indication of whether the data is "dirty" or not), or be informed that the data is not present in the L2 cache (or lower), without triggering and causing any read for the data to the memory system itself. This thereby accordingly lets the data encoder 22 check for the presence of the data that it requires in the L2 cache (or lower), for example so as to be able to determine whether it needs to return data to the memory system, without a read to the memory system itself being triggered (and correspondingly avoiding the triggering of any read to the memory system where the data encoder 22 can determine that such a read to the memory system itself is not necessary).

This then allows the data encoder 22 to handle and control the eviction of data from the L2 cache to the memory system in a way that, for example, avoids read transactions to the memory system where they are not required (and correspondingly that only uses reads to the memory system where it is determined that that is actually necessary), even in the case where prior to the read operation, the data encoder 22 does not know whether the required data is present in the L2 cache (or lower) or not.

Once it has submitted the read requests for the set of cache lines making up the block, and received the responses thereto, the data encoder then determines whether any of the lines attempted to be read from the L2 cache for the block were indicated as dirty (i.e. have been modified since they were fetched into the L2 cache) (step 123).

As shown in FIG. 9, in the case that none of the lines of the L2 cache were "dirty" (i.e. the data has not been modified while it has been present in the L2 cache), then the eviction operation can be terminated without writing the data back to the memory system (as there is no need to write the unmodified data back to the memory system). In this case therefore any data read from the L2 cache will be discarded.

As shown in FIG. 9, on the other hand, in the event that any of the lines read from the cache are "dirty" (i.e. the L2 cache 24 is storing modified data for the data block such that the data for the data block needs to be written back to the memory system 6), then it is determined whether the data encoder 22 encountered a line miss when attempting to read all the lines for the block from the L2 cache or whether any of the read lines were only partially valid (step 124). Thus the data encoder 22, in effect, determines whether all of the data for the data block in question was present in the L2 cache or not.

In the event that all the data was present in the L2 cache (and so read by the data encoder 22 when it attempted to read that data from the L2 cache), then the data encoder 22 encodes (compresses) the uncompressed data for the block that it has read from the L2 cache (step 125), and then writes the compressed data (the compressed cache lines) back to the memory 6 (step 126).

The data encoder will correspondingly update the header for the set of data blocks in question, e.g. to indicate the new compression metadata, such as the number of memory transactions needed to fetch the compressed data for the block, etc. (step 127).

In the case where it is determined that not all of the data for the block in question was stored in the L2 cache (i.e. it is determined at step 124 that there was a line miss or an only partially valid line in the L2 cache), then the data encoder 22 reads the header data for the block in question to determine whether the block should be stored in a compressed form in the memory system 6 or not (steps 128 and 129).

If it is determined that the block is not to be stored in a compressed form in memory, then the data encoder simply operates to write the uncompressed lines for the block read from the L2 cache back to the memory system 6 (step 131).

In this case therefore, the data encoder will write the uncompressed data for the block read from the L2 cache back to the memory system, with any data for the block that was not present in the L2 cache simply being left "as is" in the memory system 6.

On the other hand, when it is determined that the block is stored in a compressed form in the memory, then the data encoder 22 operates to read the compressed data for the (entire) block that is stored in the memory and to decode (decompress) that data (step 130) to provide the uncompressed form of the block as stored in the memory. This block data is stored in the data buffers 65 of the data encoder 22.

This thereby provides to the data encoder the data for the block in an uncompressed form that was "missing" from the L2 cache (since there was a line miss or an only partially valid line in the L2 cache).

(It will be appreciated from this and the overall operation shown in FIGS. 9 and 10 that this situation (where the block is stored in a compressed form in the memory and there was at least one line "miss" or an only partially valid line in the L2 cache) is the only circumstance in the eviction process in which a read request will be sent to the memory system for the data in question (that is missing from the L2 cache), and that that read request to the memory system is triggered and sent by the data encoder 22 in response to the responses to its initial read requests to the L2 cache.)

The data encoder 22 then combines the new uncompressed data for the block read from the L2 cache, together with the required remaining uncompressed data read and decoded for the block from the memory system 6, to provide a new, complete (and modified) set of uncompressed data for the block, and then encodes (compresses) that data appropriately to provide a new compressed version of the block (step 125). The new, compressed version of the block is then written back to the memory system 6 (step 126), and the header for the set of blocks in question is updated appropriately (step 127).

In this case therefore, rather than simply writing the "new" data from the L2 cache for the data block back to the memory system, a complete new, compressed version of the block is written back to the memory system 6.

This then ensures that a complete compressed block of data is written back to the memory system 6 when data from the L2 cache is to be written back to the memory system in a compressed form. This again helps to ensure coherency and synchronisation of the data blocks as data for the data blocks is transferred to and from the L2 cache.

Although the present embodiments have been described with particular reference to a graphics processing system and graphics processor, and the compression and decompression of data between the memory system and the graphics processor, the particular cache read request operation in the manner of the technology described herein can be used in any suitable and desired data processing system and with and for any suitable and desired form of data processor, processing unit, cache system, etc.

It can be seen from the above that the technology described herein, in its embodiments at least provides an efficient and effective mechanism for reading data from a cache that, in particular, facilitates opportunistic cache reads that do not trigger external memory accesses in situations where the presence or otherwise of required data in the cache is not known.

This is achieved in the embodiments of the technology described herein at least, by configuring a read request to a cache such that the read request will either return the requested data, or an indication that the requested data is not present in the cache, without the cache performing a read transaction to the memory system for the data in that event. This can then, for example, allow decisions to be made relating to the processing and handling of the data based on information about the requested data received from the cache, before any request for that data (or other, related, data) to the memory system itself is made.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a data processing system, the data processing system comprising:
   a memory system;
   a processor; and a cache system configured to transfer data stored in the memory system to the processor for use by the processor when performing data processing operations and to transfer data from the processor to the memory system;

the cache system comprising a cache configured to receive data from the memory system and to provide data to the processor for use when performing processing operations and to receive data from the processor for sending to the memory system;

the data processing system further comprising a processing unit operable to read data from the cache;

the method comprising:
when the processing unit requires data from the cache, sending to the cache a set of a plurality read requests for the data together;

the cache system, in response to the read requests, determining whether the requested data is present in the cache; and when the requested data is present in the cache, returning the data from the cache to the processing unit and invalidating the entry for the data in the cache; and when it is determined that the requested data is not present in the cache, returning an indication of that to the processing unit, without the cache system causing any external memory transactions;

the method further comprising:
when the cache returns the requested data for all of the plurality of read requests:
the processing unit processing the returned data and writing it back to the memory system; and when the cache returns the requested data for only some but not all of the plurality of read requests, and one or more of the read requests returns an indication that the requested data is not stored in the cache:
the processing unit determining whether the returned data is to be stored in the memory in a compressed or uncompressed form and, if it is determined that the returned data is to be stored in the memory in compressed form:
the processing unit requesting, from the memory system, data relating at least to the one or more of the read requests that returned an indication that the requested data was not stored in the cache, and when it has the data from the memory system, combining the data returned from the cache for the one or more of the read requests for which data was present in the cache with the data from the memory system for the one or more of the read requests that returned an indication that the requested data was not stored in the cache to provide a combined set of data, and then compressing the combined set of data; and writing the compressed combined set of data back to the memory system;

and, if it is determined that the returned data is to be stored in the memory in uncompressed form:
the processing unit writing the returned data back to the memory system in an uncompressed form without requesting any data from the memory system.

2. The method of claim 1, wherein the cache is an L2 cache of the cache system.

3. The method of claim 1, wherein the cache system includes multiple cache levels, and the determining of whether the requested data is present in the cache comprises:
determining whether the requested data is present in the cache to which the read request is made or in a lower level cache of the cache system.

4. The method of claim 3, wherein determining whether the data is present in the cache comprises:
determining whether the data is present in the cache level to which the read request is made, and in the event that the data is not present in that cache level, then determining whether the data is present in a lower level cache, and in the event that the data is present in a lower level cache, evicting data from the lower level cache to the cache to which the read request was made, such that the cache to which the read request was made can then return the requested data to the processing unit.

5. The method of claim 4, further comprising, in the event that the data is present in a lower level cache and evicted from the lower level cache to the cache to which the read request was made, invalidating the entry for the data in the lower level cache.

6. The method of claim 1, wherein the processing unit is a processing unit that is associated with the cache of the cache system.

7. The method of claim 1, wherein the processing unit is a data encoder associated with the cache and configured to:
when data is to be written from the cache to the memory system, encode uncompressed data from the cache for storing in the memory system in a compressed format and send the data in the compressed format to the memory system for storing; and when data in a compressed format is to be read from the memory system into the cache, decode the compressed data from the memory system and store the data in the cache in an uncompressed format.

8. The method of claim 1, further comprising:
when the requested data is present in the cache, also returning to the processing unit an indication whether the returned data is dirty or not.

9. The method of claim 1, further comprising:
when the cache system returns the requested data, the processing unit performing at least one of:
processing the returned data; and
writing the returned data back to the memory system.

10. The method of claim 1, further comprising:
when the cache system returns an indication that the requested data is not present in the cache, the processing unit determining whether to send a request to the memory system for the data.

11. The method of claim 1, wherein the cache system includes multiple cache levels, and the determining of whether the requested data is present in the cache comprises:
determining whether the requested data is present in the cache to which the read request is made, and in the event that the data is not present in that cache level, then sending a read request to a lower level of the cache system for the requested data, but not sending a read request for the requested data to a higher level cache of the cache system.

12. A data processing system, the data processing system comprising:
a memory system;
a processor; and
a cache system configured to transfer data stored in the memory system to the processor for use by the processor when performing data processing operations and to transfer data from the processor to the memory system;
the cache system comprising a cache configured to receive data from the memory system and to provide data to the processor for use when performing processing operations and to receive data from the processor for sending to the memory system;
the data processing system further comprising:
a processing unit operable to read data from the cache, the processing unit being configured to,
when the processing unit requires data from the cache, send to the cache a set of a plurality of read request for the data together;
and
the cache system being configured to, in response to the read requests:
determine whether the requested data is present in the cache; and
when the requested data is present in the cache, return the data from the cache to the processing unit and invalidate the entry for the data in the cache; and
when it is determined that the requested data is not present in the cache, return an indication of that to the processing unit, without the cache system causing any external memory transactions;
the processing unit further configured to, when the cache returns the requested data for all of the plurality of read requests:
process the returned data and write it back to the memory system; and
when the cache returns the requested data for only some but not all of the plurality of read requests, and one or more of the read requests returns an indication that the requested data is not stored in the cache:
the processing unit determining whether the returned data is to be stored in the memory in a compressed or uncompressed form and, if it is determined that the returned data is to be stored in the memory in compressed form:
the processing unit requesting, from the memory system, data relating at least to the one or more of the read requests that returned an indication that the requested data was not stored in the cache, and when it has the data from the memory system, combining the data returned from the cache for the one or more of the read requests for which data was present in the cache with the data from the memory system for the one or more of the read requests that returned an indication that the requested data was not stored in the cache to provide a combined set of data, and then compressing the combined set of data; and writing the compressed combined set of data back to the memory system;
and if it is determined that the returned data is to be stored in the memory in uncompressed form:
the processing unit writing the returned data back to the memory system in an uncompressed form without requesting any data from the memory system.

13. The system of claim 12, wherein the cache is an L2 cache of the cache system.

14. The system of claim 12, wherein the cache system includes multiple cache levels, and the cache system is configured to determine whether the requested data is present in the cache by:
determining whether the requested data is present in the cache to which the read request is made or in a lower level cache of the cache system.

15. The system of claim 14, wherein the cache system is configured to determine whether the data is present in the cache by:
determining whether the data is present in the cache level to which the read request is made, and in the event that the data is not present in that cache level, then determining whether the data is present in a lower level cache, and in the event that the data is present in a lower level cache, evicting data from the lower level cache to the cache to which the read request was made, such that the cache to which the read request was made can then return the requested data to the processing unit.

16. The system of claim 15, wherein the cache system is configured to, in the event that the data is present in a lower level cache and evicted from the lower level cache to the cache to which the read request was made, invalidate the entry for the data in the lower level cache.

17. The system of claim 12, wherein the processing unit is a processing unit that is associated with the cache of the cache system.

18. The system of claim 12, wherein the processing unit is a data encoder associated with the cache and is configured to:
when data is to be written from the cache to the memory system, encode uncompressed data from the cache for storing in the memory system in a compressed format and send the data in the compressed format to the memory system for storing; and
when data in a compressed format is to be read from the memory system into the cache, decode the compressed data from the memory system and store the data in the cache in an uncompressed format.

19. The system of claim 12, wherein the cache system is configured to:
when the requested data is present in the cache, also return to the processing unit an indication whether the returned data is dirty or not.

20. The system of claim 12, wherein the processing unit is configured to:
when the cache system returns the requested data, perform at least one of:
processing the returned data; and
writing the returned data back to the memory system.

21. The system of claim 12, wherein the processing unit is configured to:
when the cache system returns an indication that the requested data is not present in the cache:
determine whether to send a request to the memory system for the data.

22. The system of claim 12, wherein the cache system includes multiple cache levels, and the cache system is configured to determine whether the requested data is present in the cache by:
determining whether the requested data is present in the cache to which the read request is made, and in the event that the data is not present in that cache level, then sending a read request to a lower level of the cache system for the requested data, but not sending a read request for the requested data to a higher level cache of the cache system.

23. A non-transitory computer readable storage medium storing computer software code which when executing on one or more processors performs a method of operating a data processing system, the data processing system comprising:
a memory system;
a processor; and
a cache system configured to transfer data stored in the memory system to the processor for use by the processor when performing data processing operations and to transfer data from the processor to the memory system;

the cache system comprising a cache configured to receive data from the memory system and to provide data to the processor for use when performing processing operations and to receive data from the processor for sending to the memory system;

the data processing system further comprising a processing unit operable to read data from the cache;

the method comprising:

when the processing unit requires data from the cache, sending to the cache a set of a plurality of read requests for the data together;

the cache system, in response to the read request, determining whether the requested data is present in the cache; and when the requested data is present in the cache, returning the data from the cache to the processing unit and invalidating the entry for the data in the cache; and when it is determined that the requested data is not present in the cache, returning an indication of that to the processing unit, without the cache system causing any external memory transactions the method further comprising:

when the cache returns the requested data for all of the plurality of read requests:

the processing unit processing the returned data and writing it back to the memory system;

and when the cache returns the requested data for only some but not all of the plurality of read requests, and one or more of the read requests returns an indication that the requested data is not stored in the cache:

the processing unit determining whether the returned data is to be stored in the memory in a compressed or uncompressed form and, if it is determined that the returned data is to be stored in the memory in compressed form:

the processing unit requesting, from the memory system, data relating at least to the one or more of the read requests that returned an indication that the requested data was not stored in the cache, and when it has the data from the memory system, combining the data returned from the cache for the one or more of the read requests for which data was present in the cache with the data from the memory system for the one or more of the read requests that returned an indication that the requested data was not stored in the cache to provide a combined set of data, and then compressing the combined set of data; and writing the compressed combined set of data back to the memory system;

and, if it is determined that the returned data is to be stored in the memory in uncompressed form:

the processing unit writing the returned data back to the memory system in an uncompressed form without requesting any data from the memory system.

24. A cache system for a data processing system, the cache system:

configured to transfer data stored in a memory system to a processor for use by the processor when performing data processing operations and to transfer data from the processor to the memory system; and comprising a cache configured to receive data from the memory system and to provide data to the processor for use when performing processing operations and to receive data from the processor for sending to the memory system;

the cache system being configured to, in response to receiving a set of a plurality of read requests for data together:

determine whether the requested data is present in the cache; and when the requested data is present in the cache, return the data from the cache and invalidate the entry for the data in the cache; and when it is determined that the requested data is not present in the cache, return an indication of that, without the cache system causing any external memory transactions;

the processor further configured to, when the cache returns the requested data for all of the plurality of read requests:

process the returned data and write it back to the memory system; and when the cache returns the requested data for only some but not all of the plurality of read requests, and one or more of the read requests returns an indication that the requested data is not stored in the cache:

the processor determining whether the returned data is to be stored in the memory in a compressed or uncompressed form and, if it is determined that the returned data is to be stored in the memory in compressed form:

the processor requesting, from the memory system, data relating at least to the one or more of the read requests that returned an indication that the requested data was not stored in the cache, and when it has the data from the memory system, combining the data returned from the cache for the one or more of the read requests for which data was present in the cache with the data from the memory system for the one or more of the read requests that returned an indication that the requested data was not stored in the cache to provide a combined set of data, and then compressing the combined set of data; and writing the compressed combined set of data back to the memory system;

and if it is determined that the returned data is to be stored in the memory in uncompressed form:

the processor writing the returned data back to the memory system in an uncompressed form without requesting any data from the memory system.

* * * * *